United States Patent
Shingai

(10) Patent No.: US 8,411,010 B2
(45) Date of Patent: Apr. 2, 2013

(54) CHOLESTERIC LIQUID CRYSTAL DISPLAY DEVICE INCLUDING A VOLTAGE STABILIZATION PART SURPRESSING VARIATIONS IN OUTPUT VOLTAGE

(75) Inventor: Tomohisa Shingai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 354 days.

(21) Appl. No.: 12/681,655

(22) Filed: Apr. 5, 2010

(65) Prior Publication Data

US 2010/0194728 A1   Aug. 5, 2010

Related U.S. Application Data

(63) Continuation of application No. PCT/JP2007/070086, filed on Oct. 15, 2007.

(51) Int. Cl.
G09G 3/36 (2006.01)
(52) U.S. Cl. ............................................. 345/97; 345/87
(58) Field of Classification Search .............. 345/87–104
See application file for complete search history.

(56) References Cited

U.S. PATENT DOCUMENTS

| | | | |
|---|---|---|---|
| 5,923,542 A | 7/1999 | Sasaki et al. | |
| 7,019,737 B1 | 3/2006 | Asai et al. | |
| 2007/0279350 A1 * | 12/2007 | Huang et al. | 345/87 |

FOREIGN PATENT DOCUMENTS

| | | |
|---|---|---|
| JP | 4-062516 A | 2/1992 |
| JP | 11-136931 A | 5/1999 |
| JP | 2000-147466 A | 5/2000 |
| JP | 2000-171837 A | 6/2000 |
| JP | 2001-228459 A | 8/2001 |
| JP | 2004-29801 A | 1/2004 |
| JP | 2005-242210 A | 9/2005 |
| JP | 2006-251279 A | 9/2006 |
| WO | 2007/110949 A1 | 10/2007 |

OTHER PUBLICATIONS

Y.M. Zhu et al, "Cumulative Drive Schemes for Bistable Reflective Cohlesteric LCDS," SID 98 Digest, 1998, pp. 798-801.
International Search Report of PCT/JP2007/070086, mailing date of Jan. 8, 2008.

* cited by examiner

Primary Examiner — Bipin Shalwala
Assistant Examiner — Steven Holton
(74) Attorney, Agent, or Firm — Westerman, Hattori, Daniels & Adrian, LLP

(57) ABSTRACT

A cholesteric liquid crystal display device in which a first step for applying a high voltage pulse to initialize a pixel and a second step for applying a low voltage pulse to increase a coexistence ratio of a focal conic state to the planar state in the initialized pixel are performed and a gradation value is determined by a cumulative time during which the low voltage pulse is applied, the device includes: a voltage generation circuit; and a driver circuit, wherein: the voltage generation circuit includes: a step-up part that generates a step-up voltage from a power source voltage; a voltage switching part; and a voltage stabilization part that generates the predetermined voltage in accordance with the voltage control signal from the step-up voltage, wherein the voltage stabilization part suppresses variations in output voltage; and the step-up part switches step-up ratios between the first step and the second step.

17 Claims, 20 Drawing Sheets

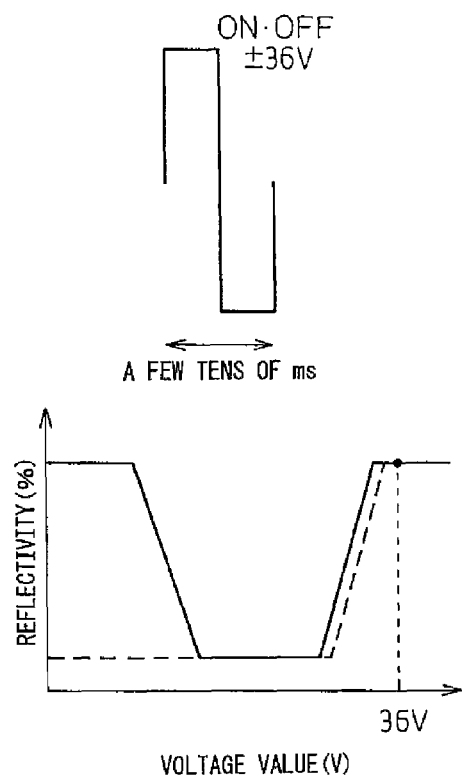

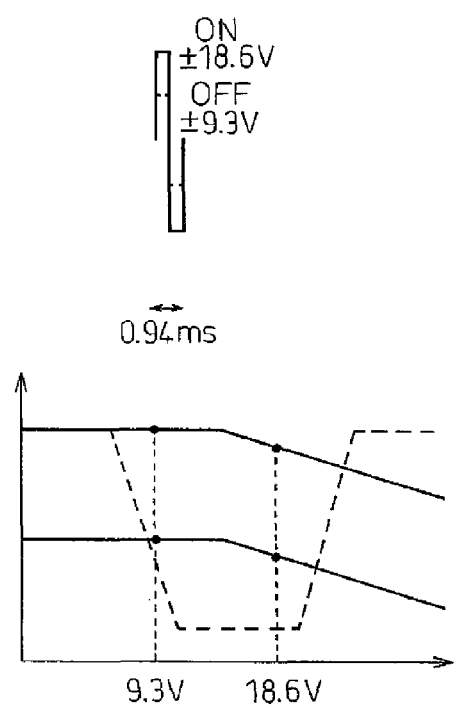

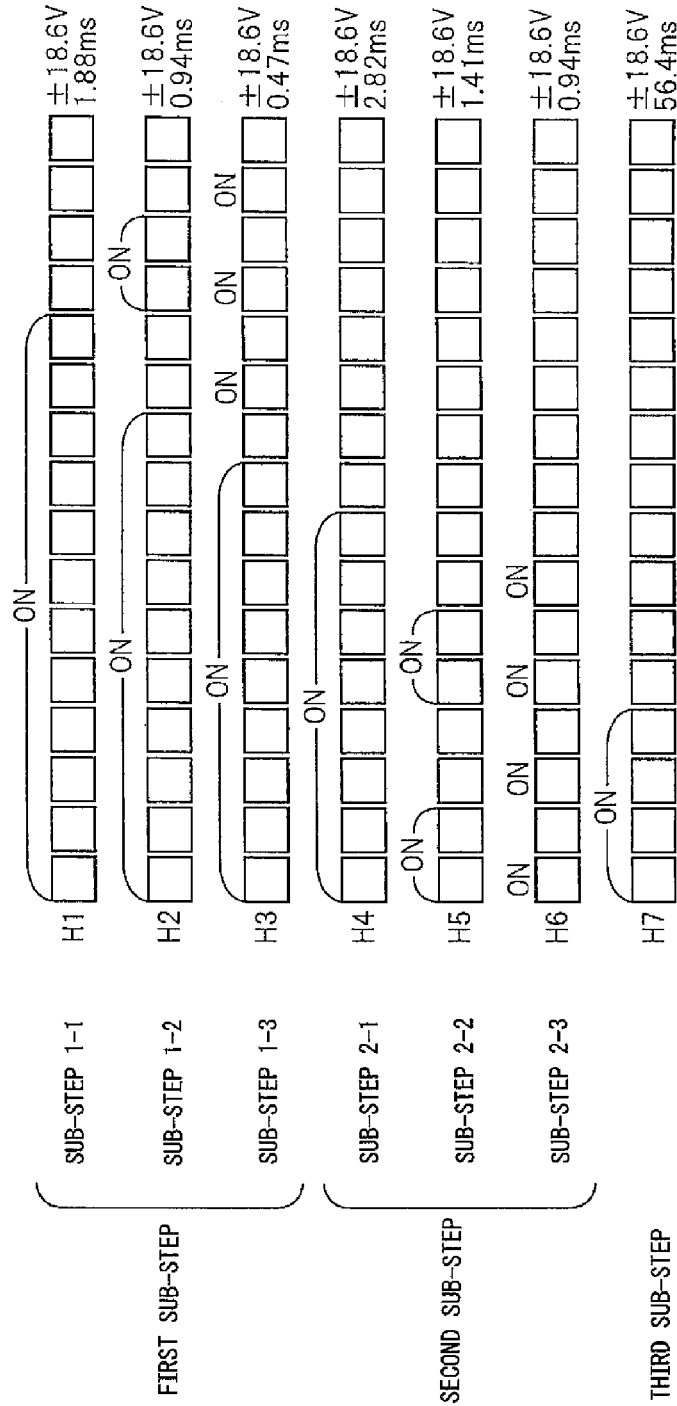

| COMMON DRIVER | SEGMENT DRIVER | POSITIVE POLARITY | NEGATIVE POLARITY |
|---|---|---|---|
| ON | ON | 18.6 | −18.6 |
| | OFF | 9.3 | −9.3 |
| OFF | ON | 4.65 | −4.65 |
| | OFF | −4.65 | 4.65 |

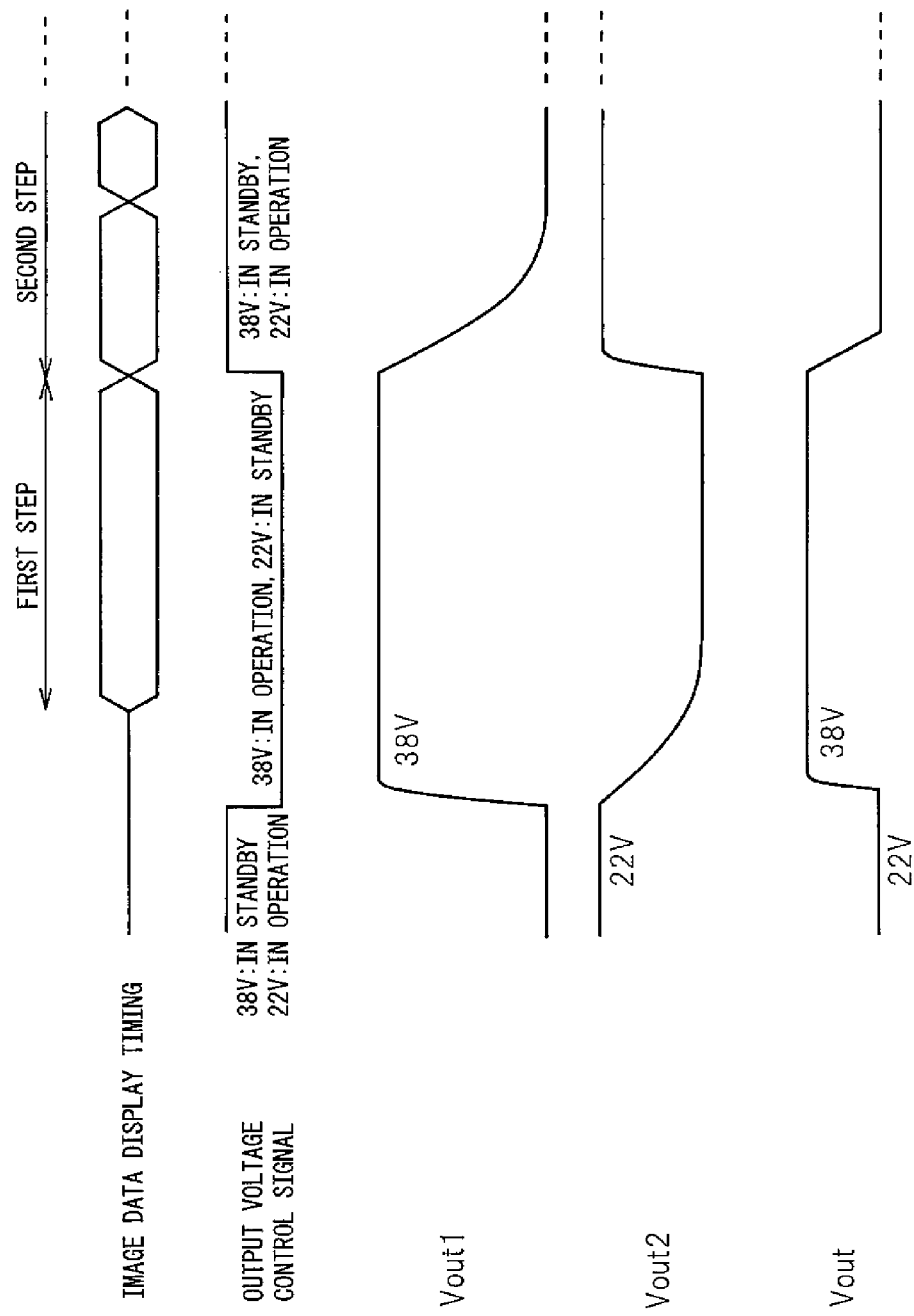

CHOLESTERIC LIQUID CRYSTAL DISPLAY DEVICE INCLUDING A VOLTAGE STABILIZATION PART SURPRESSING VARIATIONS IN OUTPUT VOLTAGE

CROSS-REFERENCE TO RELATED APPLICATIONS

This application is a continuation application and is based upon PCT/JP2007/070086, filed on Oct. 15, 2007, the entire contents of which are incorporated herein by reference.

FIELD

The embodiments discussed herein are related to a cholesteric liquid crystal display device and a drive method thereof.

BACKGROUND

In recent years, the development of electronic paper has been promoted in companies, universities, etc. Applied fields expected to utilize electronic paper have been proposed, including a variety of fields, such as electronic books, a sub-display for mobile terminal equipment, and a display part of an IC card. One promising methods of electronic paper is that which uses cholesteric liquid crystal. A cholesteric liquid crystal has excellent characteristics, such as the ability to semipermanently hold a display (memory property), vivid color display, high contrast, and high resolution.

Cholesteric liquid crystals are also referred to as chiral nematic liquid crystals, which form a cholesteric phase in which molecules of the nematic liquid crystal are in the form of a helix by adding a comparatively large amount (a few tens of percent) of additives (chiral material) having chiral property to the nematic liquid crystal.

FIG. 1A and FIG. 1B are diagrams explaining the states of the cholesteric liquid crystals. As illustrated in FIG. 1A and FIG. 1B, a display element 10 that utilizes cholesteric liquid crystals has an upper side substrate 11, a cholesteric liquid crystal layer 12, and a lower side substrate 13. Cholesteric liquid crystals have a planar state in which incident light is reflected as illustrated in FIG. 1A and a focal conic state in which incident light is transmitted as illustrated in FIG. 1B, and theses states are maintained stably even if there is no electric field.

In the planar state, light having a wavelength in accordance with the helical pitch of liquid crystal molecules is reflected. A wavelength $\lambda$ at which reflection is maximum is expressed by the following expression where n is an average refractive index and p is a helical pitch $$\lambda = n \cdot p.$$

On the other hand, a reflection band $\Delta\lambda$ differs considerably depending on a refractive index anisotropy $\Delta n$ of liquid crystal.

In the planar state, a "bright" state can be displayed because incident light is reflected. On the other hand, in the focal conic state, a "dark" state, i.e., black can be displayed because light having passed through the liquid crystal layer is absorbed by a light absorbing layer provided under the lower side substrate 13.

Next, a method of driving a display element that utilizes cholesteric liquid crystals is explained.

FIG. 2 illustrates an example of a voltage-reflection characteristic of general cholesteric liquid crystals. The horizontal axis represents a voltage value (V) of a pulse voltage to be applied with a predetermined pulse width between electrodes that sandwich cholesteric liquid crystals and the vertical axis represents a reflectivity (%) of cholesteric liquid crystals. A curve P of a solid line illustrated in FIG. 2 represents the voltage-reflectivity characteristic of cholesteric liquid crystals when the initial state is the planar state and a curve FC of a broken line represents the voltage-reflectivity characteristic of cholesteric liquid crystals when the initial state is the focal conic state.

In FIG. 2, if a predetermined high voltage VP100 (for example, ±36 V) is applied between the electrodes to generate a relatively strong electric field in the cholesteric liquid crystal, the helical structure of the liquid crystal molecules is undone completely and a homeotropic state is brought about, where all of the molecules align in the direction of the electric field. Next, when the liquid crystal molecules are in the homeotropic state, if the applied voltage is reduced rapidly from VP100 to a predetermined low voltage (for example, VF0=±4 V) to reduce the electric field in the liquid crystal almost to zero, the helical axis of the liquid crystal becomes perpendicular to the electrode and the planar state is brought about, where light in accordance with the helical pitch is reflected selectively.

On the other hand, if a predetermined low voltage VF100b (for example, ±24 V) is applied between electrodes to generate a relatively weak electrical field in the cholesteric liquid crystal, a state is brought about where the helical structure of the liquid crystal molecules is not undone completely. In this state, if the applied voltage is reduced rapidly from VF100b to the low voltage VF0 to rapidly reduce the electric field in the liquid crystal almost to zero, or a strong electric field VP100 is removed gradually, the helical axis of the liquid molecule becomes parallel with the electrode and the focal conic state where incident light is transmitted is brought about.

Further, if the electric field is removed rapidly by applying an electric field of intermediate strength, the planar state and the focal conic state coexist in a mixed condition and it is possible to display a gradation.

A display is produced by utilizing the above-mentioned phenomena.

The principles of a driving method based on the voltage response characteristic described above are explained with reference to FIG. 3A to FIG. 3C.

FIG. 3A illustrates the pulse response characteristic when the pulse width of a voltage pulse is a few tens of ms, FIG. 3B illustrates the pulse response characteristic when the pulse width of a voltage pulse is 1.88 ms, and FIG. 3C illustrates the pulse response characteristic when the pulse width of a voltage pulse is 0.94 ms. In each figure, a voltage pulse to be applied to a cholesteric liquid crystal is illustrated on the upper side and the voltage-reflectivity characteristic is illustrated on the lower side, and the horizontal axis represents a voltage (V) and the vertical axis represents reflectivity (%). As a well known drive pulse of a liquid crystal, a voltage pulse is a combination of a positive polarity pulse and a negative polarity pulse in order to prevent the liquid crystal from deteriorating due to polarization.

As illustrated in FIG. 3A, when the pulse width is great, as illustrated by the solid line, if the initial state is the planar state, the state changes into the focal conic state when the voltage is raised to a certain range and if the voltage is further raised, the state changes into the planar state again. As illustrated by the broken line, when the initial state is the focal conic state, the state gradually changes into the planar state as the pulse voltage is raised.

When the pulse width is great, the voltage pulse, at which the state changes into the planar state whether the initial state is the planar state or the focal conic state, is ±36 V, and therefore, the initialization pulse is set to a pulse of ±36 V as illustrated in FIG. 3A. With a pulse voltage in the middle of this range, the state is such that the planar state and the focal conic state coexist in a mixed condition, and therefore, a gradation can be obtained.

On the other hand, when the pulse width is 1.88 ms as illustrated in FIG. 3B, when the initial state is the planar state, the reflectivity remains unchanged when the voltage pulse is about 10 V, however, at higher voltages, the state is such that the planar state and the focal conic state coexist in a mixed condition, and therefore, the reflectivity is reduced. The amount of reduction in reflectivity increases as the voltage is increased, however, when the voltage is increased than 36 V, the amount of reduction in reflectivity becomes constant. This is also the same when the initial state is a state where the planar state and the focal conic state coexist in a mixed condition. Because of this, when the initial state is the planar state, if a voltage pulse having a pulse width of 1.88 ms and a pulse voltage of about 20 V is applied once, the reflectivity is reduced by a certain amount. In this manner, in the state where the planar state and the focal conic state coexist in a mixed condition and the reflectivity is reduced by a small amount, if a voltage pulse having a pulse width of 1.88 ms and a pulse voltage of about 20 V is further applied, the reflectivity is reduced further. If this is repeated, the reflectivity is reduced to a predetermined value. As described above, when the pulse width is 1.88 ms, the reflectivity (gradation) changes by a voltage pulse of about 20 V, but does not change by a voltage pulse of about 10 V, and therefore, the pulse in FIG. 3B is set to ±18.6 V when ON, and to ±9.3 V when OFF.

As illustrated in FIG. 3C, when the pulse width is 0.94 ms, the reflectivity is reduced when a voltage pulse is applied in a manner similar to that when the pulse width is 1.88 ms, however, the amount of reduction in reflectivity is smaller compared to the case where the pulse width is 1.88 ms.

From the above, it can be thought that if a pulse of 36 V having a great width is applied, the planar state is brought about and if a gradation pulse of about ten-something to 20 V is applied, a state where the planar state and the focal conic state coexist in a mixed condition is brought about and the reflectivity is reduced, and the amount of reduction in reflectivity depends on the cumulative time of the gradation pulse.

As to the multi-gradation display method by cholesteric liquid crystal, there have been proposed various driving methods. The method of driving a multi-gradation display by cholesteric liquid crystal is divided into a dynamic driving method and a convention driving method.

Japanese Laid-open Patent Publication No. 2001-228459 describes a dynamic driving method. Y.-M. Zhu, D-K. Yang, Cumulative Drive Schemes for Bistable Reflective Cholesteric LCDs, SID 98 DIGEST, pp 798-801, 1998 describes the conventional driving method.

Japanese Laid-open Patent Publication No. 2000-147466 and Japanese Laid-open Patent Publication No. 2000-171837 describe a method of driving a fast-forward mode that applies resetting to the focal conic state.

When a gradation is set by utilizing the cumulative time by the conventional driving method, there can be thought a method in which the pulse width is varied, in addition to a method of adjusting the number of times of application of a short pulse, as described above. The method of varying the pulse width has an advantage over the method of adjusting the number of times of application of a short pulse from the standpoint of suppression of power consumption. Hereinafter, a method of setting a gradation by varying the pulse width to vary the cumulative time is referred to as a pulse width modulation (PWM) method.

Japanese Laid-open Patent Publication No. 04-62516 describes a configuration in which a positive polarity pulse and a negative polarity pulse having different pulse widths are applied in a liquid crystal display device, although the display device does not use a cholesteric liquid crystal.

FIG. 4 is a diagram explaining an example of a writing method in which a gradation is written by varying the cumulative application time of a pulse in combination of both the number of times of application of a pulse and the pulse width.

In a first step, initialization processing is performed in which a high voltage pulse of ±36 V having a pulse width of 40 ms is applied to all of the pixels and all of the pixels are brought into the planar state.

In a second step, processing to write a gradation is performed. The second step is divided into three sub-steps, that is, first, second and third sub-steps, and the first sub-step is further divided into three sub-steps, that is, 1-1, 1-2 and 1-3 and the second sub-step is further divided into three sub-steps, i.e., 2-1, 2-2 and 2-3.

In the sub-step 1-1, a pulse of ±18.6 V having a pulse width of 1.88 ms is applied, in the sub-step 1-2, a pulse of ±18.6 V having a pulse width of 0.94 ms is applied, and in the sub-step 1-3, a pulse of ±18.6 V having a pulse width of 0.47 ms is applied. The three sub-steps 1-1, 1-2 and 1-3 can be performed continuously when one scan line is selected or can be performed as different frames. Similarly, in the sub-step 2-1, a pulse of ±18.6 V having a pulse width of 2.82 ms is applied, in the sub-step 2-2, a pulse of ±18.6 V having a pulse width of 1.41 ms is applied, and in the sub-step 2-3, a pulse of ±18.6 V having a pulse width of 0.94 ms is applied. The three sub-steps 2-1, 2-2 and 2-3 can be performed continuously when one scan line is selected or can be performed as different frames. In the third sub-step 3, a pulse of ±18.6 V having a pulse width of 5.64 ms is applied. The sub-steps 1-1, 1-2, 1-3, 2-1, 2-2, 2-3 and 3 can also be performed continuously when one scan line is selected.

The gradation level of each pixel is determined by combining the sub-steps to be turned ON. For example, for a gradation of zero, all of the sub-steps are turned ON. For a gradation level of 3, the sub-steps 1-1, 1-2, 1-3, 2-1 and 3 are turned ON and the other sub-steps are turned OFF. For a gradation level of 12, the sub-steps 1-2 and 1-3 are turned ON and the other sub-steps are turned OFF.

FIG. 5 is a diagram illustrating a configuration of the whole display device in the conventional example in which the display element 10 of simple matrix type having a display material with memory properties, such as cholesteric liquid crystal, is used. For example, the display element 10 is in conformity with the A4 size/XGA specifications and has 1,024×768 pixels. A power source 21 outputs a voltage of, for example, 3 V to 5 V. A step-up part 22 steps up an input voltage from the power source 21 to 38 V by a regulator, such as a DC-DC converter. A voltage switching part 23 generates various voltages by voltage division using a resistor etc. A voltage stabilization part 24 uses a voltage follower circuit of an operational amplifier in order to stabilize the various voltages supplied from the voltage switching part 23.

An original oscillation clock part 25 generates a base clock used as a base of the operation. A divider part 26 divides the base clock and generates various clocks necessary for the operation, to be described later.

A control circuit 27 generates a control signal based on the base clock, various clocks, and image data D and supplies it to a common driver 28 and a segment driver 29.

The common driver 28 drives 768 scan lines and the segment driver 29 drives 1,024 data lines. Because image data given to each pixel of RGB are different, the segment driver 29 drives each data line independently. The common driver 28 drives the line of RGB commonly. In the present embodiment, a driver IC uses a general-purpose STN driver that outputs two values. As a general-purpose STN driver that can be used, various drivers are available.

As described above, in the cholesteric liquid crystal display device, a voltage pulse of ±36 V having a pulse width of 40 ms is applied in the first step. In the second step, a voltage pulse of ±18.6 V having a narrow pulse width is applied to a pixel to be written. Because of this, the scan lines includes a line to which a selection voltage is applied and a line to which a non-selection voltage is applied, and the data lines include a line to which an ON voltage is applied and a line to which an OFF voltage is applied, and there are four combinations of applied voltages. It is necessary that only in a pixel corresponding to a scan line to which a selection voltage is applied and a data line to which an ON voltage is applied, the gradation be changed and not changed in other pixels. A general-purpose STN driver is configured to have voltage terminals to which four kinds of voltage V0, V21, V34 and V5 are supplied and to output a voltage pulse that satisfies the above-mentioned requirement.

FIG. 6A is a diagram illustrating voltage pulses to be output in the positive polarity and negative polarity phases of the segment driver 29 and the common driver 28.

As illustrated in FIG. 6A, the segment driver 29 is supplied with 18.6 V, 9.3 V, 9.3 V and 0 V as V0, V21S, V34S and V5 and outputs a voltage pulse with an ON voltage of V0 (18.6 V) and an OFF voltage of V34 (9.3 V) in the positive polarity phase and outputs a voltage pulse with an ON voltage of V5 (0 V) and an OFF voltage of V21 (9.3 V) in the negative polarity phase. Similarly, the common driver 28 is supplied with 18.6 V, 13.95 V, 4.65 V and 0 V as V0, V21S, V34S and V5 and outputs a voltage pulse with an ON voltage of V5 (0 V) and an OFF voltage of V21 (13.95 V) in the positive polarity phase and outputs a voltage pulse with an ON voltage of V0 (20 V) and an OFF voltage of V34 (4.65 V) in the negative polarity phase.

Because the voltage pulses described above are output from the common driver 28 and the segment driver 29, voltages as illustrated in FIG. 6B are applied to each pixel in accordance with a combination of ON/OFF voltages of the common driver 28 and the segment driver 29.

In the first step, the segment driver 29 is supplied with 36 V, 36 V, 0 V and 0 V as V0, V21S, V34S and V5 and the common driver 28 is supplied with 36 V, 36 V, 0 V and 0 V as V0, V21C, V34C and V5.

The voltage stabilization part 24 of the power source circuit outputs V5, V21S, V21C, V34S and V34C. V5 is 0 V (GND) and it does not need to be output from the voltage stabilization part 24. Consequently, the voltage stabilization part 24 of the power source circuit outputs 36 V, 36 V, 36 V, 0 V and 0 V as V5, V21S, V21C, V34S and V34C in the first step and outputs 18.6 V, 13.95 V, 9.3 V, 9.3 V and 4.65 V in the second step.

FIG. 7 is a diagram illustrating a conventional circuit configuration example of the voltage switching part 23 and the voltage stabilization part 24 and such a circuit is provided for V5, V21S, V21C, V34S and V34C, respectively. In other words, five such circuits are provided. Vout is a step-up voltage output from the step-up part 22 and 38 V. The voltage switching part 23 has a serial resistor row to generate a desired voltage by dividing Vout and an analog switch 31 that switches voltages to be output. For example, a circuit configured to generate V21C generates 36 V as a voltage A and 9.3 V as a voltage B by division using a resistor, and the analog switch 31 selects and outputs one of the voltages A and B. The voltage stabilization part 24 has an operational amplifier 32 that constitute a voltage follower circuit and realizes a high source/sink capability required by a liquid crystal driver.

FIG. 8 is a time chart illustrating the operation in the conventional liquid crystal display device illustrated in FIG. 5. Immediately before the first step is initiated, the step-up part 22 is changed from the standby state into the operating state by a step-up circuit control signal and outputs the step-up voltage Vout. The output voltage Vout from the step-up part 22 is 38 V, the same both in the first step and in the second step. When the first step is completed, the voltage switching signal is switched to another, and accordingly, the voltage to be supplied to the liquid crystal driver is switched to another.

The energy consumed in the second step accounts for about 99% of the total consumed energy in the first step and in the second step. In the second step, as described above, a voltage of 38 V is applied to the operational amplifier 32 of the five voltage stabilization parts 24 and voltages of 18.6 V, 13.95 V, 9.3 V, 9.3 V and 4.65 V are output, respectively, and therefore, more than half the energy is consumed in the operational amplifier 32. Consequently, by switching the power source voltages of the operational amplifier 32 between the first step and the second step, it is possible to reduce the consumption of energy.

For example, if it is assumed that the size of the display element 10 is A6 and the power source voltage of the operational amplifier 32 is 38 V, the same both in the first step and in the second step, while the average power consumption of the part including the operational amplifier, the common driver 28, the segment driver 29 and the display element 10 is 146 mW, the average power consumption is reduced to 85 mW when the power source voltage of the operational amplifier 32 is set to 22 V in the second step. The consumed current of the operational amplifier 32 in the standby state is 220 μA, and therefore, 1.1 mA in total for the five operational amplifiers, and while a total of the consumed current of the operational amplifier 32 in the standby state is 41.8 mW at 38 V, it is 24.2 mW at 22 V.

For a cholesteric liquid crystal display device, consumption of energy is very important because it is related to the lifetime of a battery. As described above, it is possible to reduce consumption of energy by setting the power source voltage of the operational amplifier 32 to an optimum voltage in the first step and in the second step, respectively, however, such a measure is not conventionally used. The reason for this is explained below.

There are two configurations for switching the output voltages Vout of the step-up part 22. In one configuration, the step-up part 22 is configured by a one step-up circuit and the step-up ratios of the step-up circuit are switched and in the other configuration, the step-up part 22 is configured by two step-up circuits of different output voltages and an output is selected.

FIG. 9 is a diagram illustrating a configuration of a conventional example of the step-up part 22 that has one step-up circuit and the step-up ratios are switched thereby. Reference numeral 35 represents a step-up circuit IC, for example, LT3463 (brand name) manufactured by Linear Technology Corporation. This step-up circuit IC is a step-up DC-DC converter. Reference numeral 36 is an analog switch element. Between an SW terminal and a Vout terminal of the step-up circuit IC35, a Schottky barrier diode is incorporated. The output voltage Vout is set by a voltage to be fed back to a feedback terminal FB of the step-up circuit IC35. The configuration is such that Vout is divided by two resistors, i.e., a 1,500 KΩ resistor and a 51 KΩ resistor or a 90.4 KΩ resistor selected by the analog switch element 36 and thus feedback is performed. As illustrated schematically, when the output voltage control signal is at L, the 51 KΩ resistor is selected by the analog switch element 36 and Vout changes to 38 V, and when the output voltage control signal is at H, the 90.4 KΩ resistor is selected by the analog switch element 36 and Vout changes to 22 V.

However, the step-up part 22 in FIG. 9 has a problem in that it takes a long time (settling time) for the output of the step-up circuit to reach a predetermined low voltage when the output Vout is switched from a high voltage to a low voltage. Specifically, with a 4.7 μF decoupling capacitor and a 100 KΩ discharge resistor for reducing settling time, the power consumption at the discharge resistor is 14.4 mW when Vout is 38 V and 4.8 mW when Vout is 22 V, and the settling time is 0.94 sec. In order to reduce the settling time to 0.1 sec or less, it is necessary to set the resistance value of the discharge resistor to about $\frac{1}{10}$ and in this case, the power consumption is 135 mW when Vout is 38 V and 45 mW when Vout is 22 V, which are very large values. This makes it meaningless to reduce the consumption of energy by reducing the voltage to be applied to the operational amplifier in the second step.

In the configuration in FIG. 9, the output voltages Vout are switched by switching the voltages to be fed back by selecting the 51 KΩ resistor and 90.4 KΩ resistor by the analog switch element 36; however, because of the nonlinearity of the analog switch element 36, there arises a problem in that the step-up operation is likely to become unstable when the step-up ratio is high and Vout=38 V. In particular, it takes a considerably long time to reach a constant state after the output voltages are switched and there is a problem that noise is high.

Because of the above-mentioned reasons, in the existing circumstances, the step-up part having a configuration in which one step-up circuit illustrated in FIG. 9 is provided and its step-up ratios are switched is not used.

FIG. 10 illustrates a configuration supposed when two step-up circuits of different output voltages are provided in the step-up part 22 and an output is selected. Reference numerals 37 and 38 represent the same IC as the step-up circuit IC35 in FIG. 9 and reference numeral 39 represents an analog switch element. The step-up circuit IC 37 is set so that the feedback voltage is Vout=38 V, the step-up circuit IC 38 is set so that the feedback voltage is Vout=22 V, and the output voltage Vout=38 V of the step-up circuit IC 37 and the output voltage Vout=22 V of the step-up circuit IC38 are selected by the analog switch element 39.

In the circuit configuration in FIG. 10, the two step-up circuit ICs are used and the cost is increased accordingly; however, what brings about a problem of cost is the analog switch element 39 rather than the step-up circuit IC. The analog switch element 39 is used in a large-sized, high voltage power source, and therefore, very expensive. In order to reduce the settling time required for the output of the step-up part 22 to switch from a high voltage to a low voltage, it is indispensable to use the expensive analog switch element 39. In actuality, the analog switch element 39 is more expensive compared to the step-up circuit IC.

SUMMARY

According to a first aspect of the embodiments, a cholesteric liquid crystal display device in which a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied, includes: a voltage generation circuit that outputs a predetermined voltage; and a driver circuit that generates a voltage pulse to be applied to the pixel based on the predetermined voltage supplied from the voltage generation circuit, wherein: the voltage generation circuit includes: a step-up part that generates a step-up voltage from a power source voltage; a voltage switching part that generates a voltage control signal specifying a voltage value of an output voltage from the voltage generation circuit; and a voltage stabilization part that generates the predetermined voltage in accordance with the voltage control signal from the step-up voltage supplied from the step-up part, wherein: the voltage stabilization part is configured so as to suppress variations in output voltage with respect to variations in the step-up voltage; and the step-up part switches step-up ratios between the first step and the second step.

According to a second aspect of the embodiments, a cholesteric liquid crystal display device in which a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied, includes: a voltage generation circuit that outputs a predetermined voltage; and a driver circuit that generates a voltage pulse to be applied to the pixel based on the predetermined voltage supplied from the voltage generation circuit, wherein: the voltage generation circuit includes: a step-up part that generates a step-up voltage from a power source voltage; a voltage switching part that generates a voltage control signal specifying a voltage value of an output voltage from the voltage generation circuit; and a voltage stabilization part that generates the predetermined voltage in accordance with the voltage control signal from the step-up voltage supplied from the step-up part; the voltage stabilization part is configured so as to suppress variations in output voltage with respect to variations in the step-up voltage; the step-up part has two step-up DC-DC converters that use one inductor each, and an output voltage of one of the two step-up DC-DC converters is higher than the pulse wave height of a high voltage pulse at the time of the first step and the other output voltage is higher than the pulse wave height of a lower voltage pulse at the time of the second step, and an output terminal of the two step-up DC-DC converters is connected to one output terminal via a diode; and the step-up part switches the step-up voltages between the first step and the second step by controlling the turning on/off of the two step-up DC-DC converters.

According to a third aspect of the embodiments, in a method of driving a cholesteric liquid crystal display device, the device including: a voltage generation circuit that outputs a predetermined voltage; and a driver circuit that generates a voltage pulse to be applied to a pixel based on the predetermined voltage supplied from the voltage generation circuit, wherein: the voltage generation circuit includes: a step-up part that generates a step-up voltage from a power source voltage; a voltage switching part that generates a voltage control signal specifying a voltage value of an output voltage from the voltage generation circuit; and a voltage stabilization part that generates the predetermined voltage in accordance with the voltage control signal from the step-up voltage supplied from the step-up part, wherein the voltage stabilization part is configured so as to suppress variations in output voltage with respect to variations in the step-up voltage, the method includes: a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied; and the step-up ratios of the step-up part are switched between the first step and the second step.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3A is a diagram explaining a change in reflectivity by a pulse having a high voltage and a great pulse width to be applied to cholesteric liquid crystal;

FIG. 3C is a diagram explaining a change in reflectivity by a pulse having an intermediate voltage and a narrower pulse width to be applied to cholesteric liquid crystal;

FIG. 4 is a diagram explaining an example of a method of writing a gradation by varying the cumulative application time of a pulse in combination of both the number of times of pulse application and the pulse width;

FIG. 18 is a time chart illustrating the operation of the color display device in the third embodiment.

DESCRIPTION OF EMBODIMENTS

Embodiments are explained below with reference to the drawings.

Figure 11:
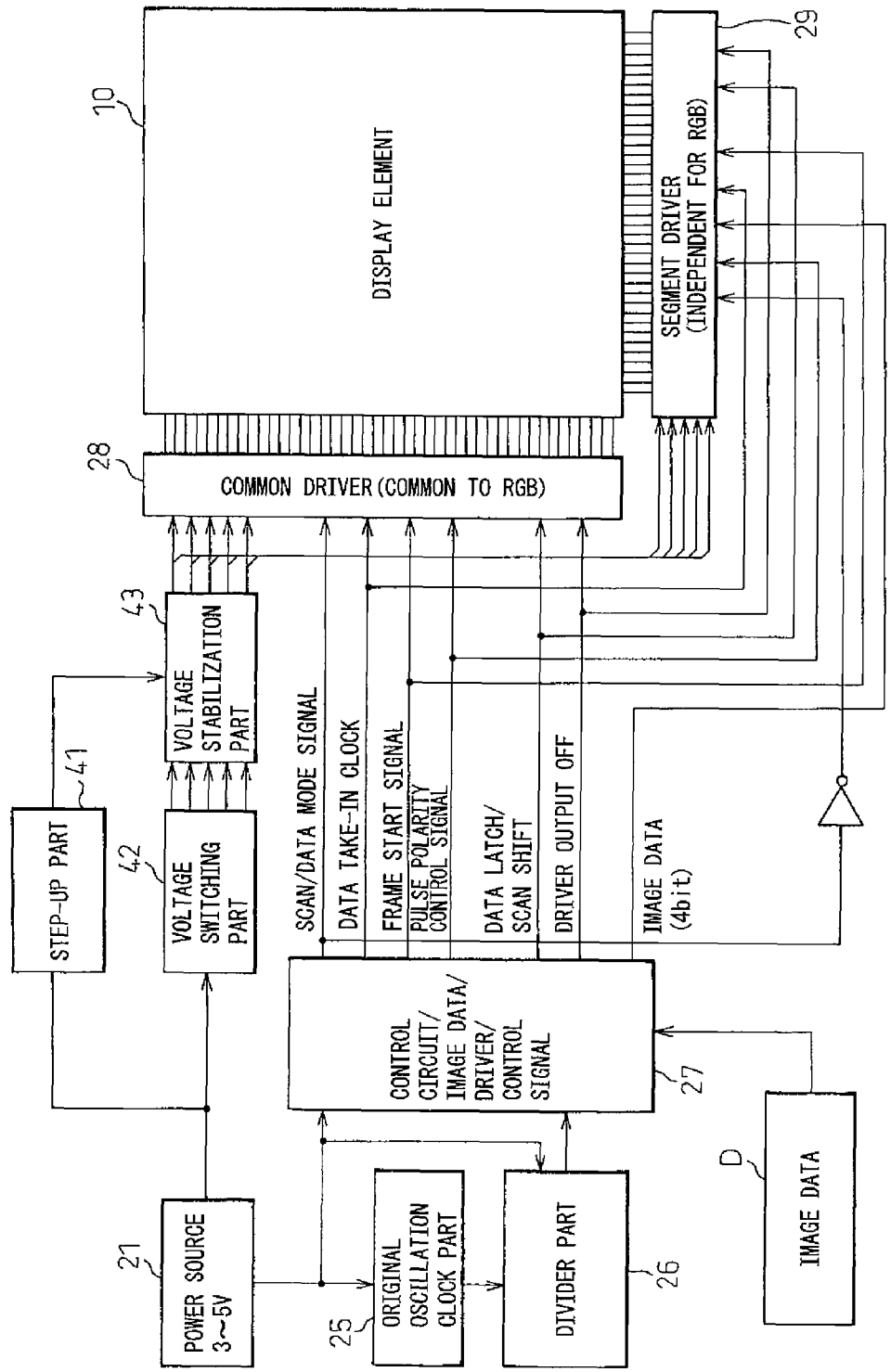
FIG. 11 is a diagram illustrating a general configuration of a color display device in a first embodiment.

FIG. 11 is a diagram illustrating a configuration of the whole of a cholesteric liquid crystal display device of a first embodiment. As is obvious from comparison with FIG. 5, the cholesteric liquid crystal display device has a configuration similar to that of the conventional display device but differs from the conventional display device in a step-up part 41, a voltage switching part 42 and a voltage stabilization part 43. Consequently, only the different parts are explained and explanation of the other parts is omitted here.

Figure 1A:
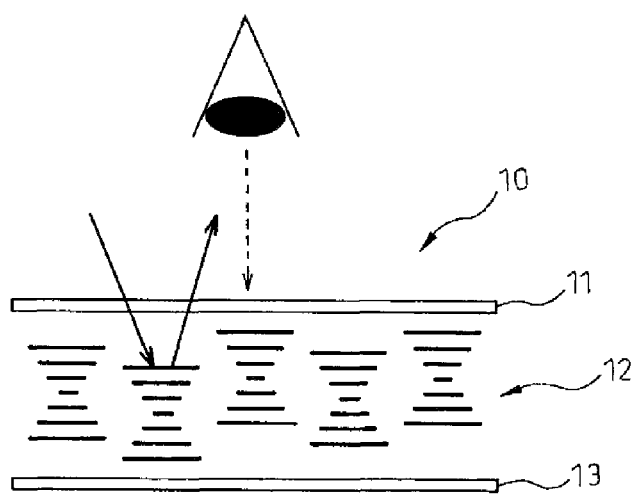
FIG. 1A is a diagram explaining a planar state of cholesteric liquid crystal.
Figure 1B:
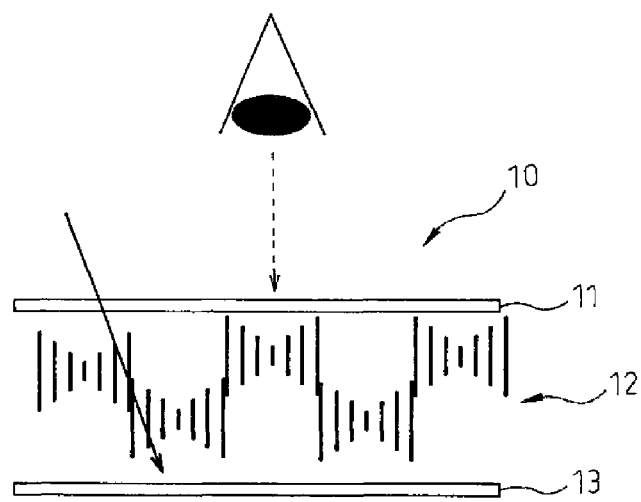
FIG. 1B is a diagram explaining a focal conic state of cholesteric liquid crystal.
Figure 2:
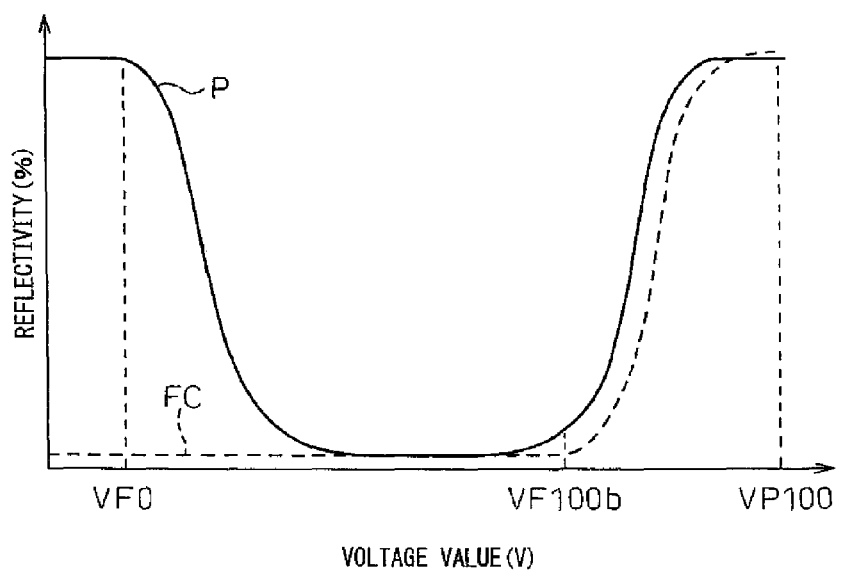
FIG. 2 is a diagram explaining a state change of cholesteric liquid crystal by a pulse voltage.
Figure 3B:
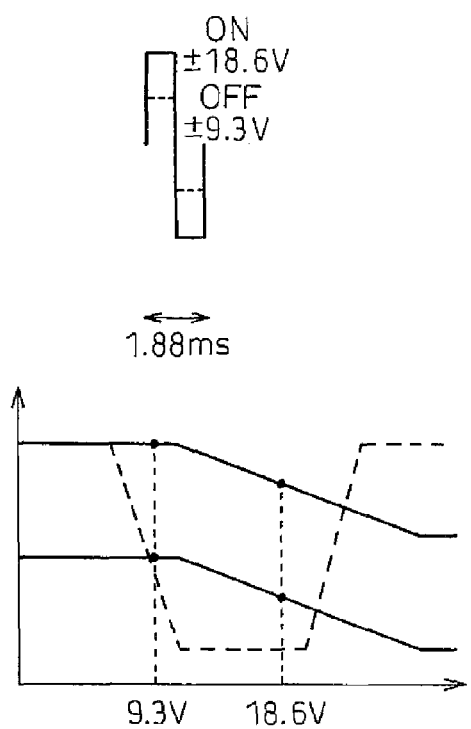
FIG. 3B is a diagram explaining a change in reflectivity by a pulse having an intermediate voltage and a narrow pulse width to be applied to cholesteric liquid crystal.
Figure 5:
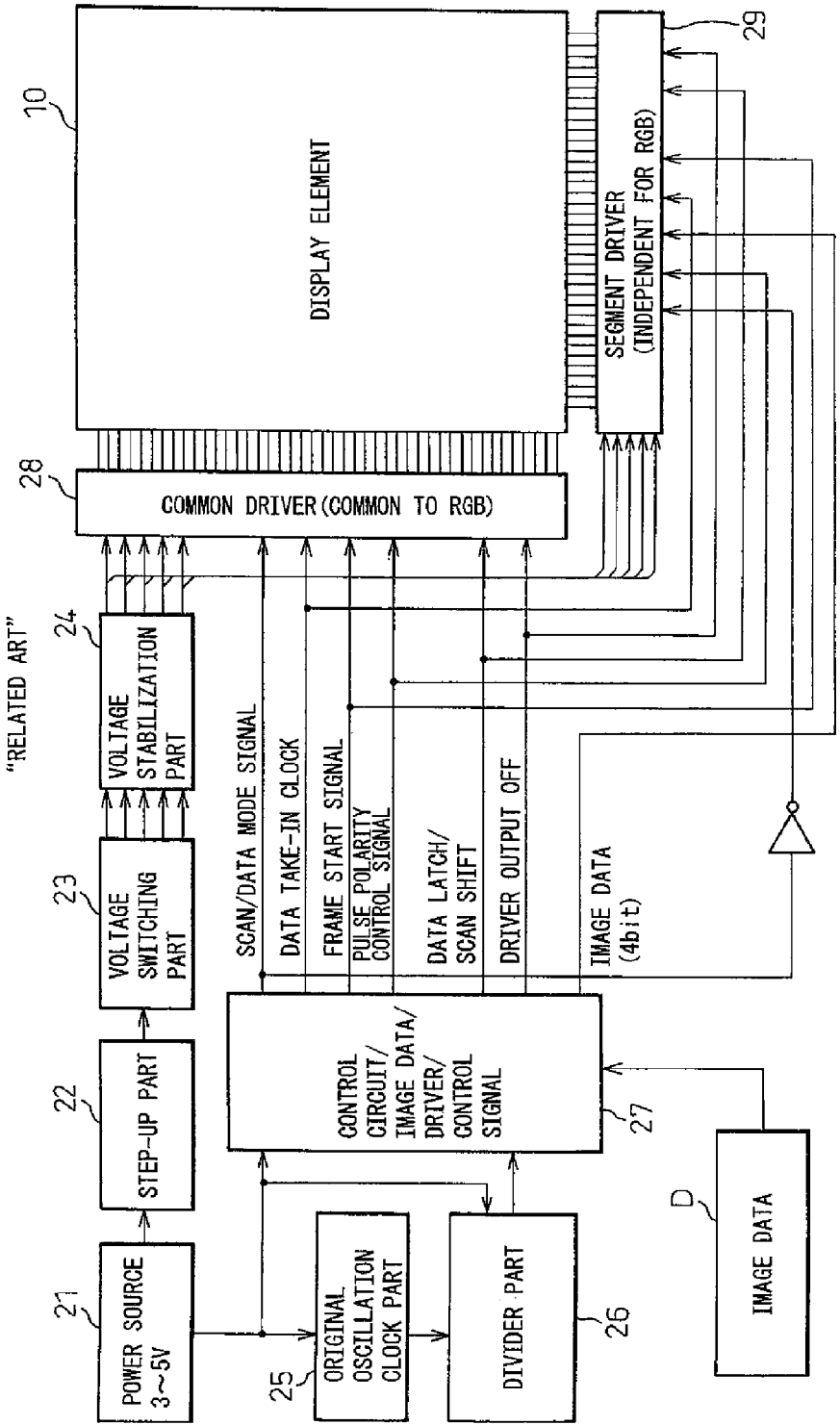
FIG. 5 is a diagram illustrating a general configuration of a conventional display device that uses cholesteric liquid crystal.
Figures 6A, 6B:
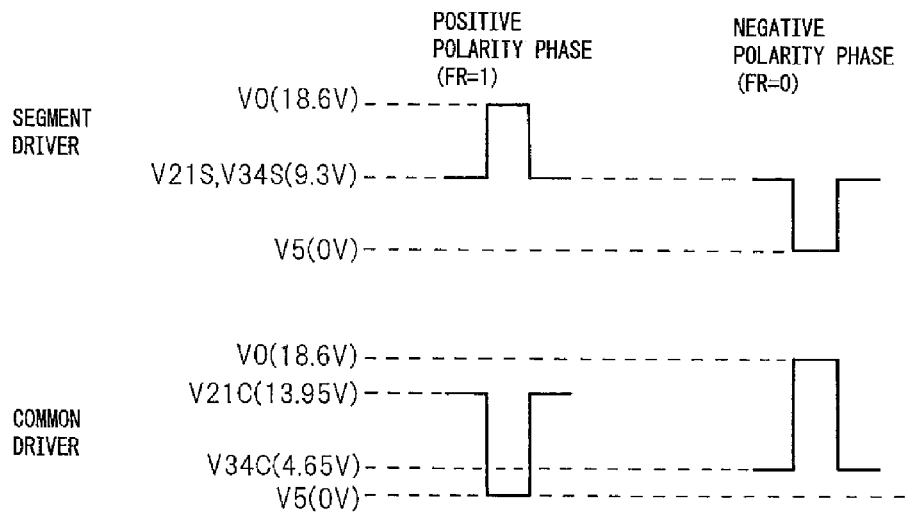
FIG. 6A is a diagram illustrating an output pulse of a general-purpose segment driver and a general-purpose common driver.
FIG. 6B is a diagram illustrating an applied voltage of liquid crystal by the output pulse in FIG. 6A.
Figure 7:
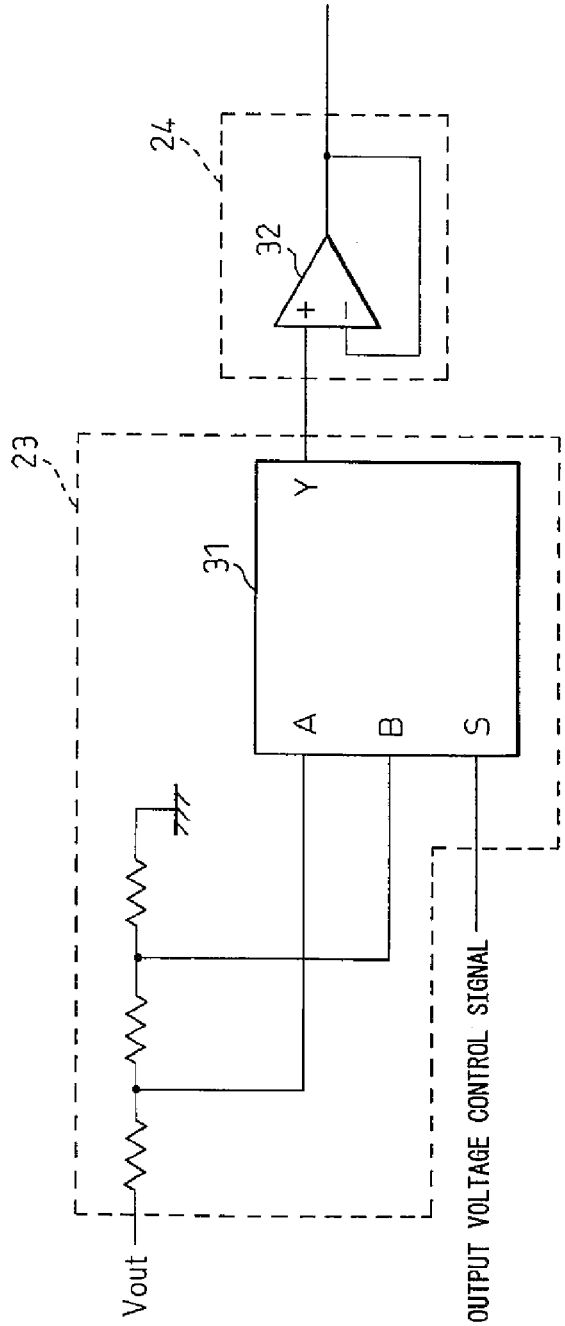
FIG. 7 is a diagram illustrating a configuration example of a conventional voltage switching part and a voltage stabilization part.
Figure 8:
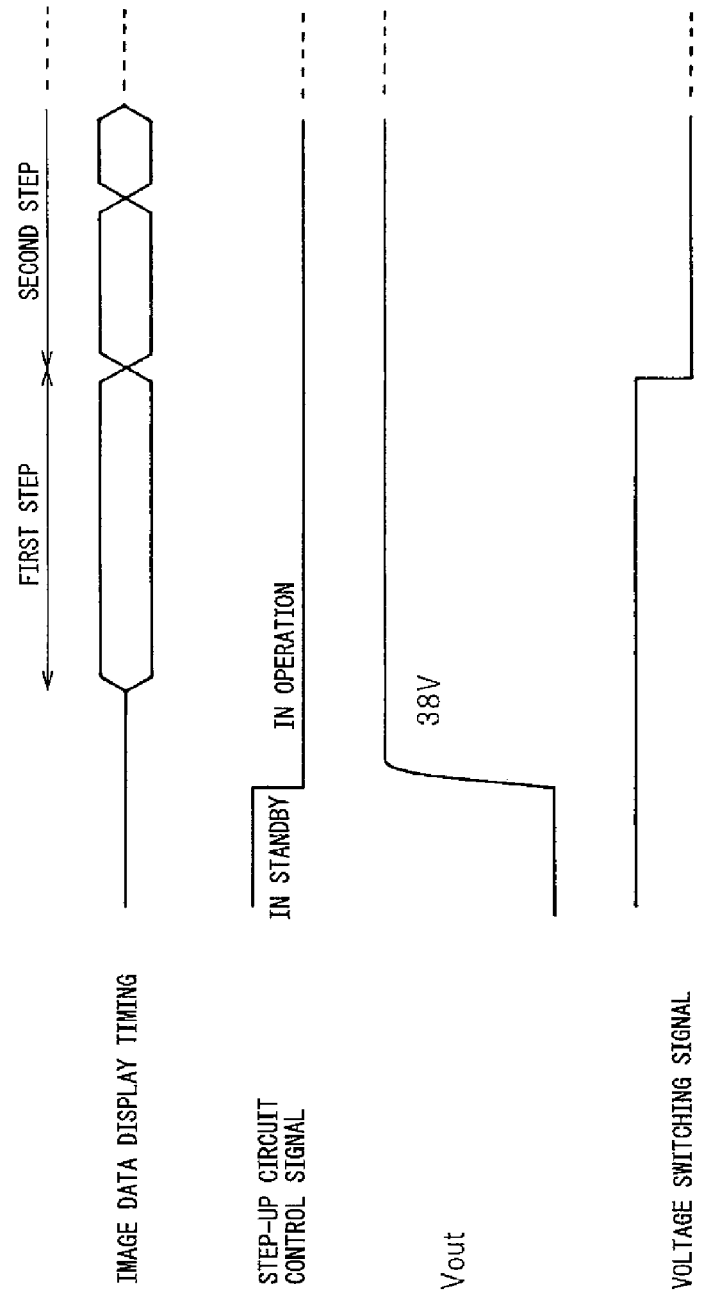
FIG. 8 is a time chart illustrating the operation in a device in a conventional example.
Figure 9:
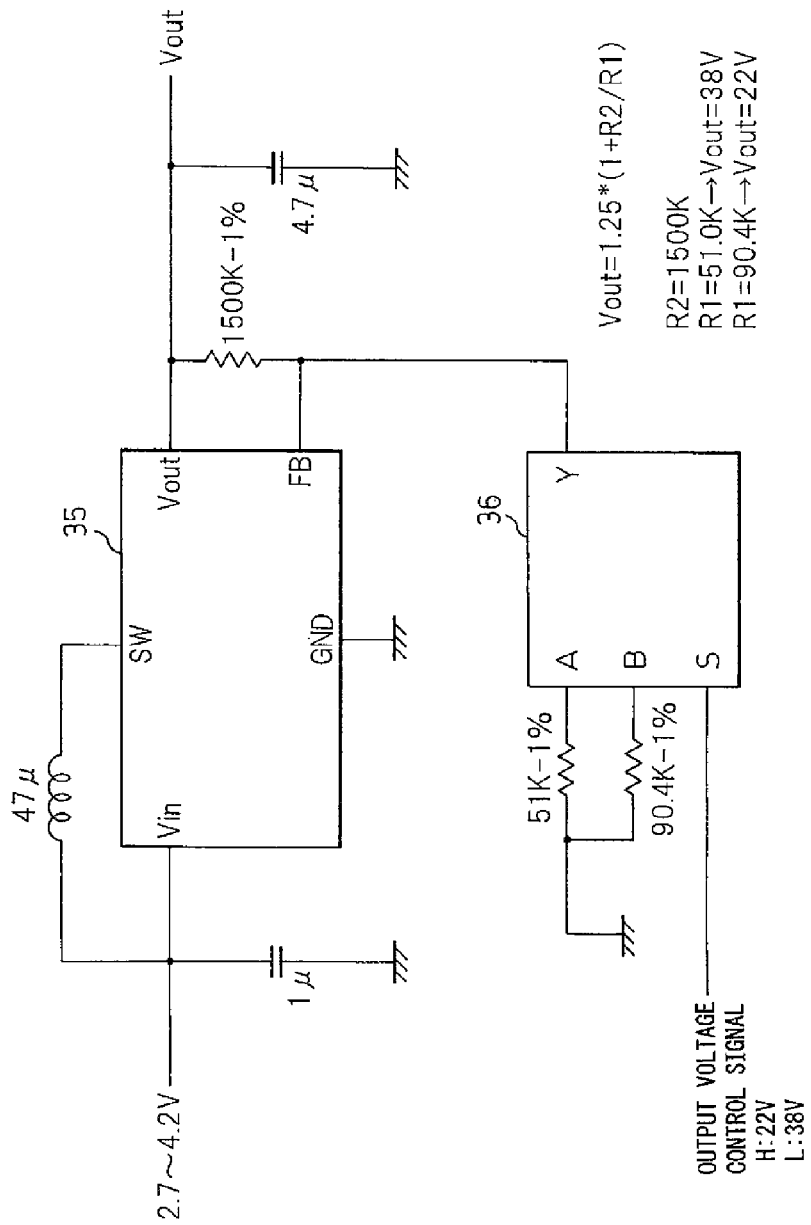
FIG. 9 is a diagram illustrating a conventional configuration example supposed of a step-up part.
Figure 10:
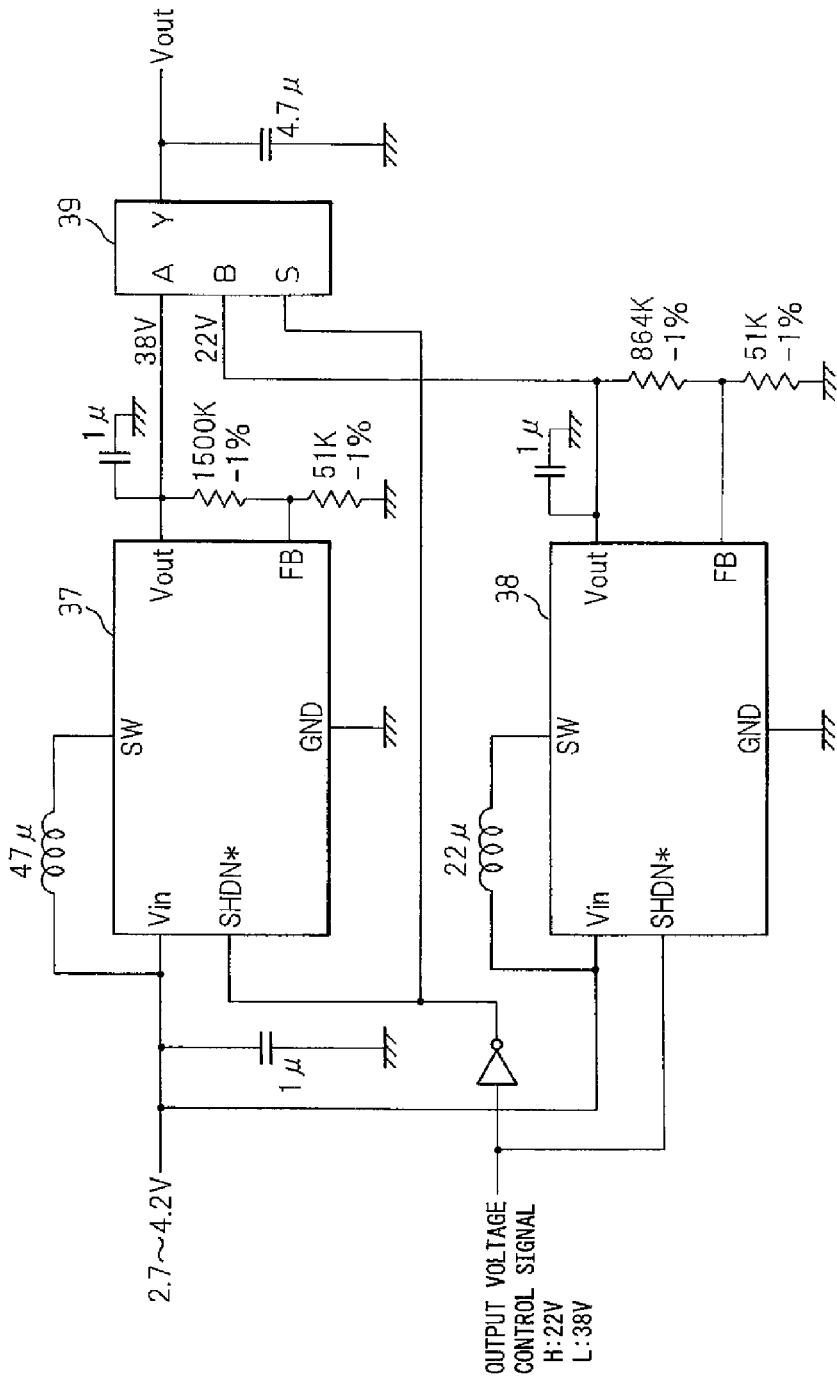
FIG. 10 is a diagram illustrating another conventional configuration example supposed of a step-up part.

As illustrated in FIG. 5, in the conventional device, the step-up part 22 generates the high voltage Vout (for example, 38 V) by stepping up the voltage of the power source 21, the voltage switching part 23 generates the voltages V0, V21S, V21C, V34S and V34C to be output by dividing the voltage Vout by a resistor, and the voltage stabilization part 24 stabilizes and outputs the voltages. In contrast to this, as illustrated in FIG. 11, in the first embodiment, the high voltage generated in the step-up part 41 is supplied to the voltage stabilization part 43. The voltage switching part 42 generates a voltage of 1/G of the voltage to be output from the voltage stabilization part 43 (output voltage to the driver) from the output voltage of the power source 21 by voltage division using a resistor etc., where the amplification factor in the voltage stabilization part 43 is assumed to be G. The voltage stabilization part 43 amplifies the voltage generated as described above and generates an output voltage to the driver. To the voltage stabilization part 43, the high voltage generated in the step-up part 41 is supplied and it is possible to generate any voltage as long as it is equal to or less than the voltage supplied from the step-up part 41, and the precision of a voltage to be generated is not affected by the voltage to be supplied.

Figure 12:
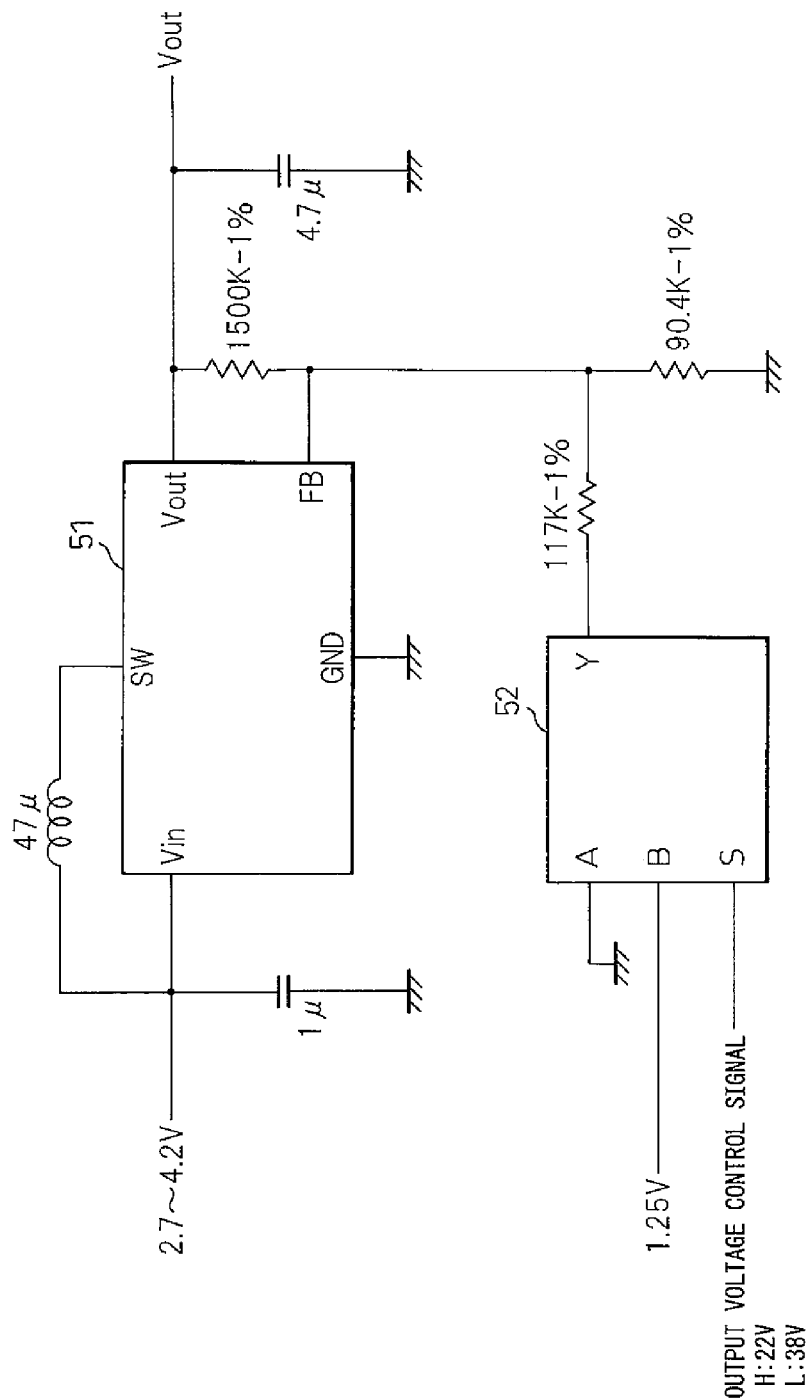
FIG. 12 is a diagram illustrating a configuration of a step-up part of the color display device in the first embodiment.

FIG. 12 is a diagram illustrating a configuration of the step-up part 41 in the first embodiment. Reference numeral 51 represents a step-up circuit IC, which can be configured by the above-described LT3463 (brand name) manufactured by Linear Technology Corporation, LM2733Y (brand name) by National Semiconductor Corporation, etc. Reference numeral 52 represents an analog switch element. Between the switching terminal SW and the output terminal Vout of LT3463 (brand name), a Schottky barrier diode is incorporated. The maximum output voltage of LT3463 (brand name) and LM2733Y (brand name) is 40 V, respectively.

As illustrated in FIG. 12, between the output terminal Vout and the feedback terminal FB of the step-up circuit IC 51, a 1,500 KΩ resistor is connected and between the feedback terminal FB and the ground (0 V), a 90.4 KΩ resistor is connected. Further, between the feedback terminal FB and an output terminal Y of the analog switch element 52, a 117 KΩ resistor is connected. The analog switch element 52 outputs the ground level (0 V) or 1.25 V to the output terminal Y in accordance with the output voltage control signal. The output voltage control signal is at L and when 0 V is output to the output terminal Y, the 90.4 KΩ resistor and the 117 KΩ resistor are connected in parallel, equivalent to the 51.0 KΩ resistor and the output voltage Vout of the step-up circuit IC 51 becomes 38 V. The output voltage control signal is at H and when 1.25 V is output to the output terminal Y, the voltage is the same as that of the FB terminal, and therefore, the 117 KΩ resistor is brought into a state equivalent to an open state and the output voltage Vout of the step-up circuit IC 51 becomes 22 V. As the analog switch element 52, a circuit that uses, for example, a D/A converter or operational amplifier, the output impedance of which is almost zero is used. Due to this, the linearity of the feedback loop can be maintained.

The method itself is publicly known, in which the step-up ratio is controlled by applying a voltage to one end of a resistor for division; however, as described above, the method cannot be used actually because the settling time when the voltage is changed from a high voltage to a low voltage is too long. In the present embodiment, as described above, the step-up voltage is supplied to the voltage stabilization part 43 and the voltage stabilization part 43 amplifies the voltage from the voltage switching part 42 and generates an output voltage regardless of the voltage value of the step-up voltage to be supplied, and therefore, it is possible for the voltage stabilization part 43 to immediately switch the output voltages accurately even if the settling time when the step-up voltage is changed from a high voltage to a low voltage is long.

Figure 13:
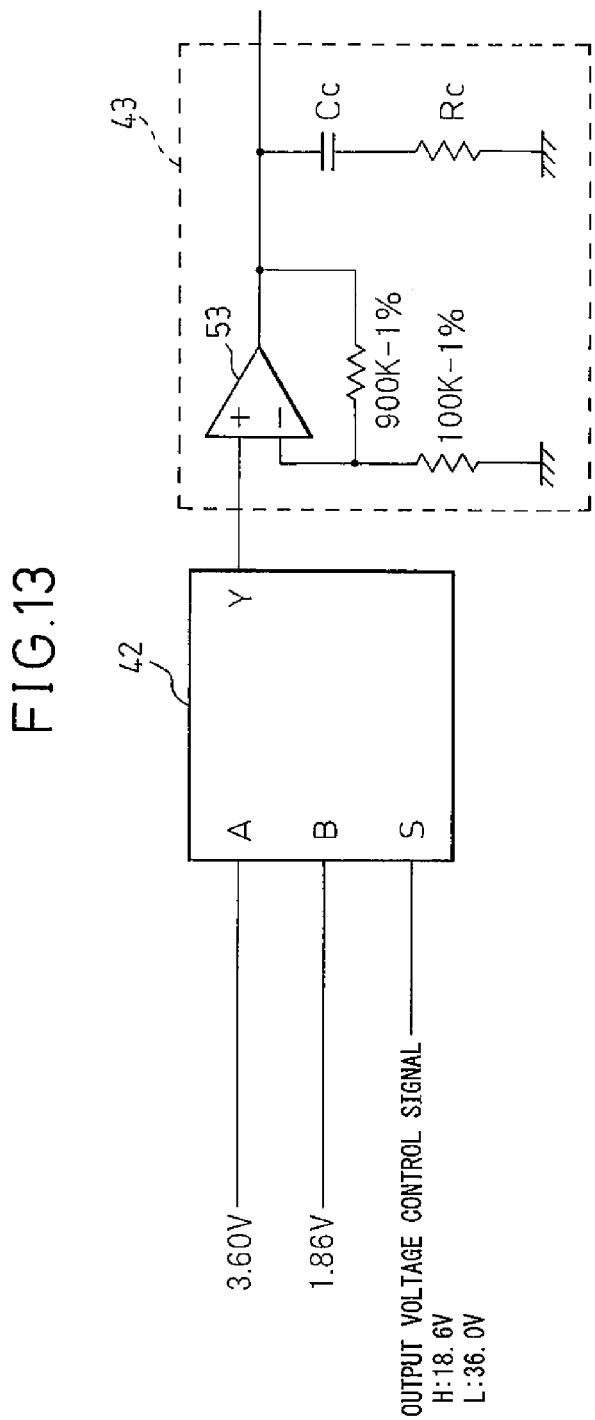
FIG. 13 is a diagram illustrating a configuration of a voltage switching part and a voltage stabilization part of the color display device in the first embodiment.

FIG. 13 is a diagram illustrating a configuration of the voltage switching part 42 and the voltage stabilization part 43 in the first embodiment. Reference numeral 42 represents an analog switch element that selects and outputs one of voltages to be input to the input terminals A and B in accordance with the output voltage control signal. To the input terminal A, 3.60 V is input and to the input terminal B, 1.86 V is input, and when the output voltage control signal is at L, 3.60 V is output and when the output voltage control signal is at H, 1.86 V is output. The voltages of 3.60 V and 1.86 V are generated by dividing the output voltage of the power source 21 by a resistor.

The voltage stabilization part 43 amplifies the voltage output from the voltage switching part 42 by a factor of 10 and outputs using an operational amplifier 53. Consequently, the voltage stabilization part 43 outputs 36.0 V when the output voltage control signal is at L and 18.6 V when the output voltage control signal is at H. The amplification factor is determined by the 900 KΩ and 100 KΩ resistors. Specifically, it is determined by a ratio of 100 KΩ to (900 KΩ+100 KΩ).

As described above, to the voltage stabilization part 43, a step-up voltage is supplied and it is possible to generate any voltage less than the step-up voltage and the voltage to be generated is not affected by the step-up voltage. In order to set the power source variation suppression ratio when suppressing the influence of variations in step-up voltage to a predetermined value or greater, a power source variation compensation circuit in which a capacitor Cc and a resistor Rc are directly connected is connected between the output of the operational amplifier and the ground. The power source variation compensation circuit is a circuit that compensates for the power source variation suppression effect at the time of light load and is set experimentally in accordance with the ripple frequency of the operational amplifier 53 and the step-up part 41. When MC33174 manufactured by ON Semiconductor Corp. is used as the operational amplifier 53, the capacitor Cc is set to 300 PF and the resistor Rc to 10 KΩ in a combination with a step-up part (step-up circuit) the switching frequency of which is 1 MHz or less. The switching frequency of LT3463, which is the above-described step-up circuit IC, is 300 KHz or less and this setting will not bring about any problem.

Figure 14:
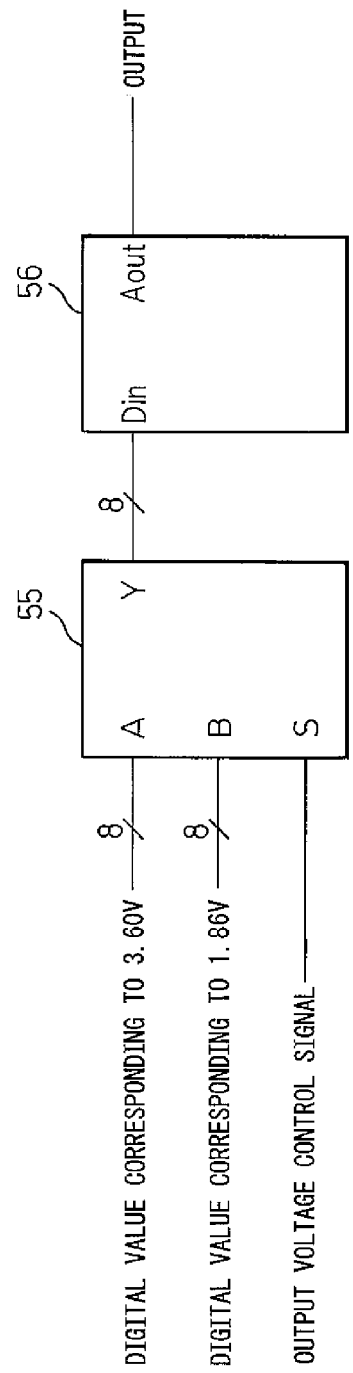
FIG. 14 is a diagram illustrating another configuration example of the voltage switching part and the voltage stabilization part of the color display device in the first embodiment.

FIG. 14 is a diagram illustrating another configuration example of the voltage switching part 42. In the voltage switching part 42 illustrated in FIG. 13, the reference voltages are switched by the analog switch element, however, in the configuration illustrated in FIG. 14, a data selector 55 and a D/A converter 56 are used. The data selector 55 selects one of an A input to input an 8-bit digital value for 3.60 V and a B input to input an 8-bit digital value for 1.86 V according to the output voltage control signal and outputs it to the D/A converter 56. The D/A converter 56 converts the input 8-bit digital value for 3.60 V or 1.86 V into an analog signal and outputs it to the operational amplifier of the voltage stabilization part 43.

The configuration of the voltage switching part 42 and the voltage stabilization part 43 is explained as above, and the number of the circuit configurations explained above to be provided corresponds to the number of kinds of voltage output from the voltage generation circuit (voltage stabilization part 43). In the first embodiment, as described above, the voltage generation circuit (voltage stabilization part 43) outputs the five kinds of voltage, that is, V0, V21S, V21C, V34S and V34C, and therefore, the five circuits described above are provided.

Figure 15:
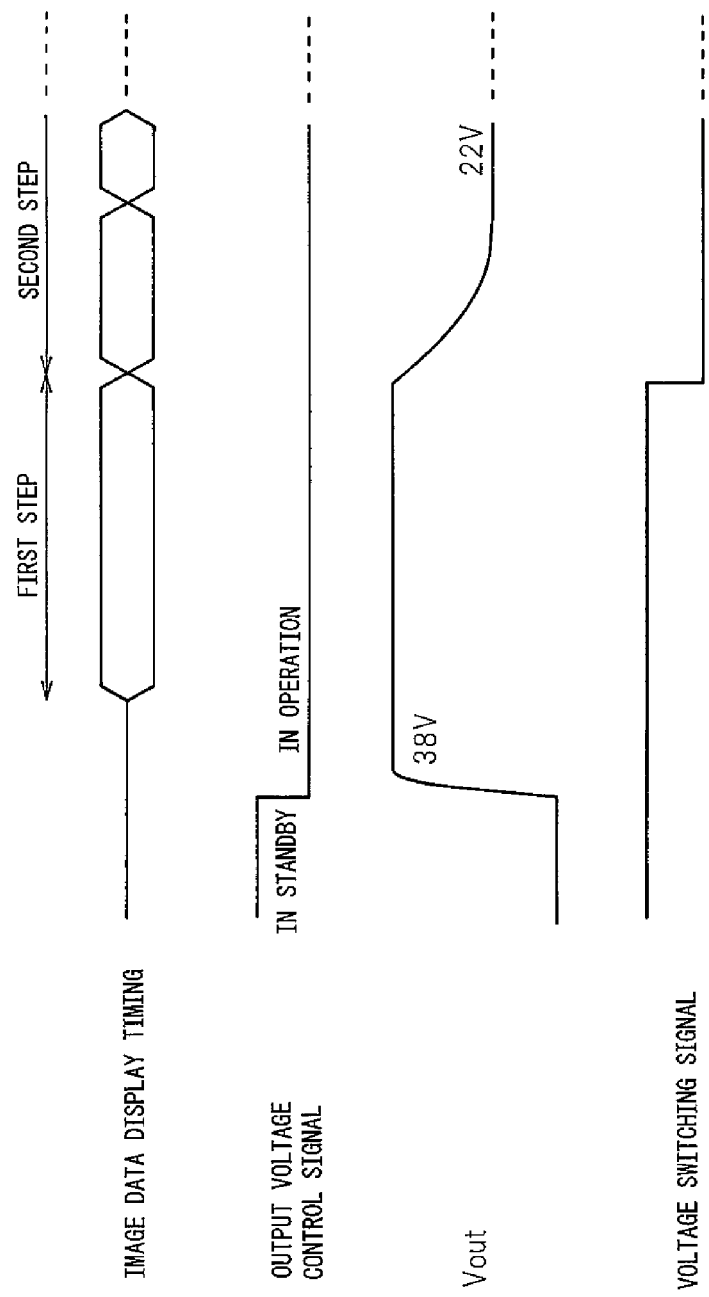
FIG. 15 is a time chart illustrating the operation of the color display device in the first embodiment.

FIG. 15 is a time chart illustrating the operation of the display device in the first embodiment. Immediately before the first step is initiated, the step-up part 22 is switched from the standby state into the operating state by the output voltage control signal and generates a step-up voltage of Vout=38 V. In accordance with the voltage switching signal, the voltage stabilization part 43 supplies 36 V, 36 V, 36 V, 0 V and 0 V as V0, V21S, V21C, V34S and V34C to the liquid crystal drivers 28, 29.

When the first step is completed, the voltage switching signal changes and the output voltage Vout of the step-up part 41 gradually changes from 38 V to 22 V. However, the voltages V0, V21S, V21C, V34S and V34C output from the voltage generation circuit (voltage stabilization part 43) immediately change to 18.6 V, 9.3 V, 13.95 V, 9.3 V and 4.65 V. Because of this, it is possible to initiate the second step immediately after the first step is completed.

Figure 16:
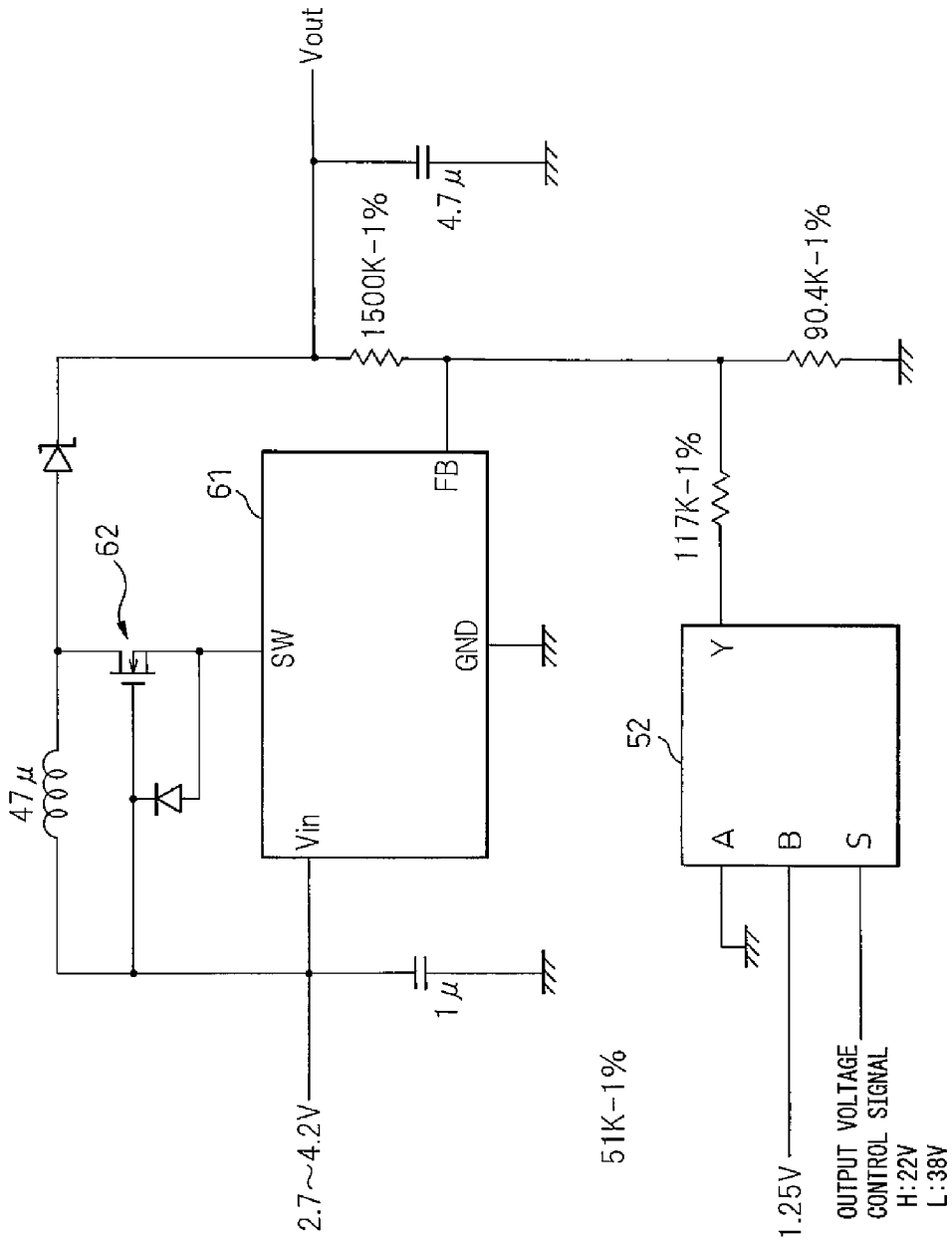
FIG. 16 is a diagram illustrating a configuration of a step-up part of a color display device in a second embodiment.

FIG. 16 is a diagram illustrating the configuration of the step-up part 41 of a cholesteric liquid crystal display device of a second embodiment. The cholesteric liquid crystal display device in the second embodiment differs from the first embodiment in that an step-up circuit IC 61 is different from the IC 51 in the first embodiment but the other parts are same as those in the first embodiment.

For example, when the power source 21 outputs 2.7 V, it is necessary for the step-up part 41 to step up a voltage of 2.7 V to 38 V. However, the number of kinds of high voltage step-up IC capable of directly realizing such a large step-up ratio is limited and there is a problem that the conversion efficiency of each IC is not sufficient. It is publicly known that a high conversion efficiency can be obtained by also using a high voltage NMOS-FET that is attached externally to a highly efficient, intermediate voltage step-up IC. In the second embodiment, this configuration is applied.

It is recommended to use MAX8574 (brand name) manufactured by Maxim Integrated Products, Inc., which has a maximum output voltage of 28 V, as the step-up circuit IC 61. As illustrated schematically, one of terminals of a MOS-FET 62 is connected to the switching terminal SW of the IC 61 and a 47 μH inductor is connected between the other terminal and an input voltage terminal Vin and a Schottky barrier diode is connected between the other terminal and a 1,500 KΩ resistor. The gate of the MOS-FET 62 is connected to the input voltage terminal Vin and at the same time, connected to the switching terminal SW via a diode. Because of the above, a high conversion efficiency can be obtained in an extremely wide output current range; however, such a use method is already known, and therefore, a detailed explanation is omitted here.

Figure 17:
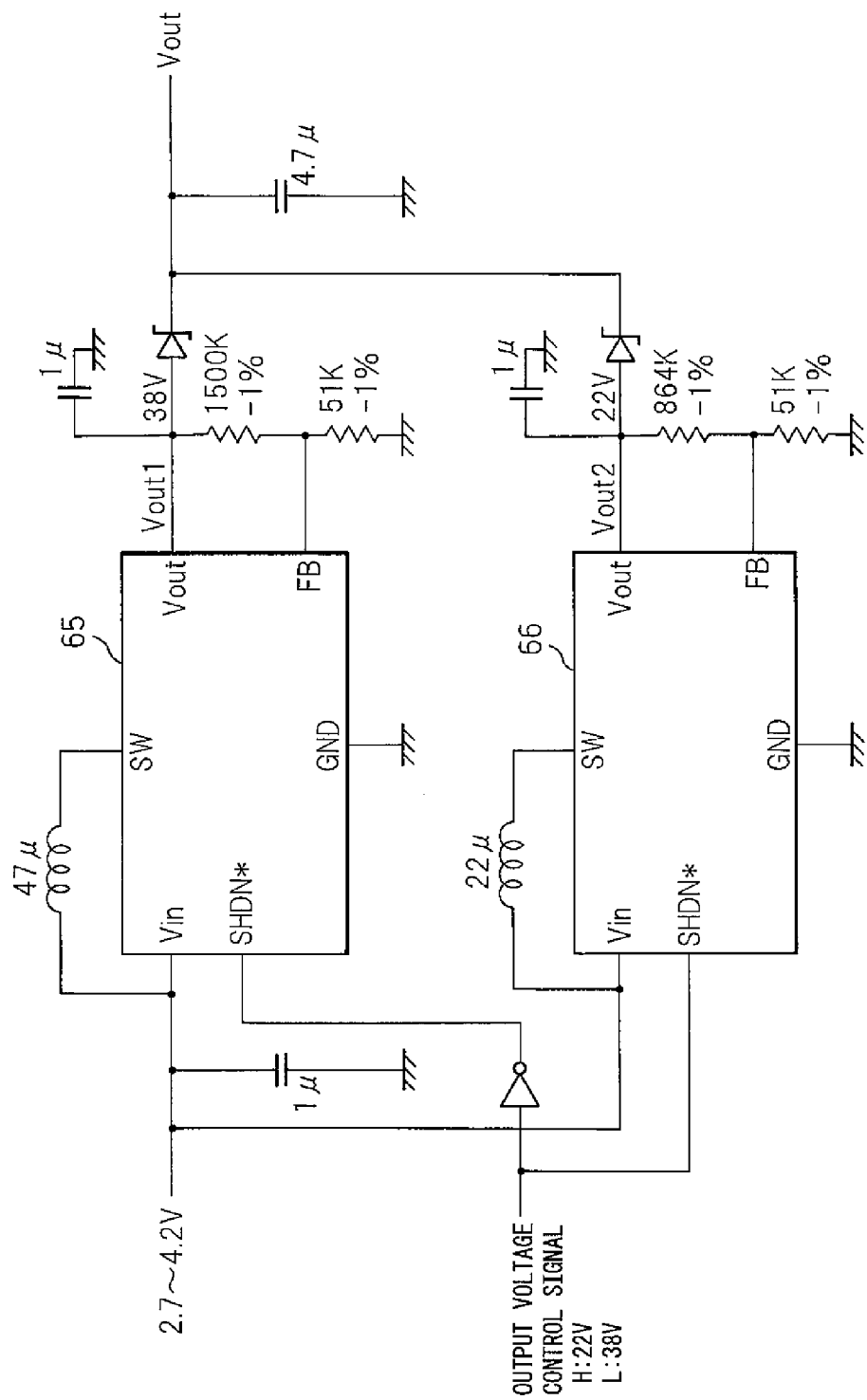
FIG. 17 is a diagram illustrating a configuration of a step-up part of a color display device in a third embodiment.

FIG. 17 is a diagram illustrating a configuration of the step-up part 41 of a cholesteric liquid crystal display device of a third embodiment. The cholesteric liquid crystal display device in the third embodiment differs from the first embodiment in that the configuration of the step-up part 41 is different from that of the step-up part 41 in the first embodiment and other parts are the same as those in the first embodiment.

The step-up part 41 in the third embodiment uses two step-up circuit ICs in a step-up DC/DC converter. To one of step-up circuit ICs, that is, a step-up circuit IC 65, a voltage, which is an output Vout1 divided by a 1,500 KΩ resistor and a 51 KΩ resistor, is fed back and the output voltage Vout1 is 38 V. To the other step-up circuit IC, that is, a step-up circuit IC 66, a voltage, which is an output Vout2 divided by a 864 KΩ resistor and a 51 KΩ resistor, is fed back and the output voltage Vout2 is 22 V. The output of the step-up circuit IC 65 and the output of the step-up circuit IC 66 are connected to the output terminal via a Schottky barrier diode, respectively. The step-up circuit IC 65 and the step-up circuit IC 66 are in the standby state when the output voltage control signal to be applied to a control terminal SHDN* is at H and in the operating state at L.

FIG. 18 is a time chart illustrating the operation of the display device in the third embodiment. Before the first step is initiated, the output voltage control signal is set to L and the step-up circuit IC 65 is brought into the operating state and the step-up circuit IC 66 into the standby state. In response to this, the output of the step-up circuit IC 65 rapidly rises up to 38 V; however, the output of the step-up circuit IC 66 gradually reduces to 0 V. At this time, Vout immediately changes to 38 V, and therefore, it is possible to initiate the first step immediately.

When the first step is completed, the output voltage control signal is set to H and the step-up circuit IC 65 is brought into the standby state and the step-up circuit IC 66 into the operating state. In response to this, the output of the step-up circuit IC 65 gradually reduces to 0V and the output of the step-up circuit IC 66 rapidly rises up to 22 V. Because Vout changes to 22 V in a sufficiently brief time, and therefore, when the voltage changes to 22 V, the second step is initiated.

The states of the step-up circuit IC 65 and the step-up circuit IC 66 can be switched alternately between the standby state and the operating state as described above, however, when the output voltage Vout is 22 V, the consumed energy is close to that in the standby state, and therefore, no problem will arise even if the step-up circuit IC 66 is brought into the operating state before the first step is initiated.

The embodiments are described as above; however, it is obvious that there can also be various embodiments.

It is also obvious that the various conditions should be determined in accordance with the specifications of a target display element.

As described above, according to the embodiments, it is possible to considerably reduce energy consumed by an operational amplifier when a gradation is displayed with a small increase in circuit area and circuit cost, and to reduce the total cost by appropriately setting the capacity of a cell, etc., in a cholesteric liquid crystal display device.

As described above, the embodiments relate to a cholesteric liquid crystal display device in which a high voltage pulse is applied to liquid crystal to initialize the state into a planar state and then, a low voltage pulse is applied to bring part thereof into a focal conic state, and a halftone value is determined by their coexistence ratio, wherein the coexistence ratio depends on an application cumulative time of the low voltage pulse.

The embodiments are applied to a cholesteric liquid crystal display device in which a first step for applying a high voltage pulse to initialize a pixel to be rewritten into a planar state and a second step for applying a low voltage pulse to increase a coexistence ratio of a focal conic state to the planar state in the initialized pixel are executed, and thereby, a gradation value is determined by the cumulative time during which the low voltage pulse is applied. The cholesteric liquid crystal display device includes a voltage generation circuit that outputs a predetermined voltage and a driver circuit that generates a voltage pulse to be applied to a pixel based on a predetermined voltage supplied from the voltage generation circuit, and the driver circuit is configured by a general-purpose STN liquid crystal driver. As described above, in the first step, a high voltage (36 V) pulse is applied and the liquid crystal is brought into the planar state; however, the voltage to be applied does not necessarily need to be exactly ±36 V, but an error to a certain level is allowable. In contrast to this, it should be noted that the low voltage pulse to be applied in the second step needs to be exact because it is used to set a gradation by the cumulative time of application of the pulse and exhibits the same effect to lengthen the cumulative time if the voltage is large, or shorten the cumulative time if the voltage is small.

The voltage generation circuit includes a step-up part to generate a step-up voltage from a power source voltage, a voltage switching part that generates a voltage control signal to specify a voltage value of the output voltage from the voltage generation circuit, and a voltage stabilization part that generates a predetermined voltage in accordance with the voltage control signal from the step-up voltage supplied from the step-up part.

This object can be realized by configuring a display device in which a voltage stabilization part is configured so as to suppress variations in output voltage with respect to variations in step-up voltage, a step-up part is configured by one step-up circuit, and the step-up ratios of the step-up circuit are switched between the first step and the second step.

In the display device, the voltage stabilization part is configured so as to suppress variations in output voltage with respect to variations in step-up voltage, and therefore, if the step-up voltage to be supplied to the voltage stabilization part is equal to or greater than the output voltage, it is possible to output a predetermined voltage regardless of the step-up voltage. Consequently, it is possible to obtain a predetermined output voltage during the long hours of switching of the step-up voltage from a high voltage to a low voltage, and therefore, the second step can be initiated immediately after the first step is completed. As described above, the output voltage of the voltage generation circuit is required to be more precise in the second step than in the first step. In the display device, it is possible to immediately obtain a low voltage with high precision even when the step-up voltage is switched from a high voltage to a low voltage, and therefore, the second step can be initiated immediately after the first step is completed. Further, even if the output voltage has not reached a low voltage yet when the second step is initiated, the output voltage gradually reduces to a low voltage, and therefore, it is possible to reduce consumption of energy in the voltage stabilization part.

The step-up part includes a step-up DC-DC converter and the step-up ratio is controlled by varying the voltage to be applied to a feedback terminal of the step-up DC-DC converter via a resistor. With this configuration, it is possible to reduce the influence of the nonlinearity of an analog switch element when generating a feedback voltage to be applied to the feedback terminal. This also applies to a second aspect, to be described later.

The configuration is designed so that the step-up part comprises a step-up DC-DC converter, the maximum output voltage of the step-up DC-DC converter is lower that the pulse wave height of a high voltage pulse at the time of the first step but higher than the pulse wave height of a low voltage pulse at the time of the second step, and a transistor to be connected to a switch output of the step-up DC-DC converter has a withstand voltage higher than the pulse wave height of the high voltage pulse at the time of the first step. Preferably, the transistor to be connected to the switch output of the step-up DC-DC converter is an NMOS-FET.

Further, the object can be also realized by configuring a display device in which a voltage stabilization part is configured so as to suppress variations in output voltage with respect to variations in step-up voltage, a step-up part has two step-up DC-DC converters that use one inductor each, and step-up voltages are switched between a first step and a second step by controlling the turning on/off of the two step-up DC-DC converters.

In the display device, the step-up part includes two step-up DC-DC converters, and therefore, the cost is increased accordingly; however, a high voltage power source switch, which is a factor that considerably increases the cost, is not used, and therefore, an increase in the cost is small. On the other hand, consumed energy can be reduced by half or more, and therefore, it is possible to reduce the total cost by making appropriate the capacity of a cell, etc.

The reason for the use of an expensive high voltage power source switch in the conventional example is to reduce the settling time at the time of switching from a high voltage to a low voltage; however, the voltage stabilization part is configured to suppress variations in output voltage with respect to variation in step-up voltage, and therefore, it is possible to solve the problem of the long settling time. Due to this, it is possible to use two inexpensive Schottky barrier diodes instead of the expensive high voltage power source switch.

In the above display devices, the voltage stabilization part is configured to include an amplifier circuit configured to suppress variations in output voltage with respect to variations in step-up voltage, a voltage amplification factor G of the amplifier circuit is greater than one, and the input voltage of the amplifier circuit is 1/G of the voltage to be applied to a pixel by a driver circuit and not affected by the output voltage of the step-up DC-DC converter. The number of the amplifier circuits to be provided corresponds to the number of kinds of voltage output from the power source circuit (voltage stabilization circuit).

Specifically, the amplifier circuit has an inverting amplifier circuit or a non-inverting amplifier circuit of an operational amplifier having a power source variation suppression function and a circuit that compensates for the reduction in power source voltage variation suppression ratio in a high frequency region. By making use of the power source variation suppression function of the operational amplifier in this manner, it is possible to avoid the settling time accompanying the change in step-up voltage, in particular, the influence within the long settling hours accompanying the change from a high voltage to a low voltage. At the time of light load, the power source variation suppression function of the operational amplifier is degraded, and therefore, it is desirable to provide a compensation circuit for a light load. Specifically, the compensation circuit is realized by a serially connected circuit of a capacitive element and a resistor connected to the output terminal of the operational amplifier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A cholesteric liquid crystal display device in which a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied, the device comprising:
   a voltage generation circuit that outputs a predetermined voltage; and
   a driver circuit that generates a voltage pulse to be applied to the pixel based on the predetermined voltage supplied from the voltage generation circuit, wherein:
   the voltage generation circuit comprises:
      a step-up part that generates a step-up voltage from a power source voltage;
      a voltage switching part that generates a voltage control signal specifying a voltage value of an output voltage from the voltage generation circuit; and
      a voltage stabilization part that generates the predetermined voltage in accordance with the voltage control signal from the step-up voltage supplied from the step-up part, wherein:
   the voltage stabilization part is configured so as to suppress variations in output voltage with respect to variations in the step-up voltage; and
   the step-up part switches step-up ratios between the first step and the second step.

2. The cholesteric liquid crystal display device according to claim 1, wherein:
   the voltage stabilization part comprises an amplifier circuit configured to suppress variations in output voltage with respect to variations in the step-up voltage;
   a voltage amplification factor G of the amplifier circuit is greater than one; and
   an input voltage of the amplifier circuit is 1/G of a voltage that driver circuit applies to a pixel and is not affected by an output voltage of the step-up part.

3. The cholesteric liquid crystal display device according to claim 2, wherein
   the amplifier circuit has an inverting amplifier circuit or non-inverting amplifier circuit of an operational amplifier and a circuit that compensates for the reduction in power source voltage variation suppression ratio in a high frequency region.

4. The cholesteric liquid crystal display device according to claim 3, wherein
   the circuit that compensates for the reduction in power source voltage variation suppression ratio in a high frequency region is a serially connected circuit of a capacitive element and a resistor connected to an output terminal of the operational amplifier.

5. The cholesteric liquid crystal display device according to claim 1, wherein the step-up part comprises a step-up DC-DC converter and a step-up ratio is controlled by changing a voltage to be applied to a feedback terminal of the step-up DC-DC converter via a resistor.

6. The cholesteric liquid crystal display device according to claim 1, wherein:
the step-up part comprises a step-up DC-DC converter;
the maximum output voltage of the step-up DC-DC converter is lower than the wave pulse height of a high voltage pulse at the time of the first step, however, higher than the pulse wave height of a low voltage pulse at the time of the second step; and
a transistor to be connected to a switch output of the step-up DC-DC converter has a withstand voltage higher than the pulse wave height of a high voltage pulse at the time of the first step.

7. The cholesteric liquid crystal display device according to claim 6, wherein
the transistor to be connected to the switch output of the step-up DC-DC converter is an NMOS-FET.

8. A cholesteric liquid crystal display device in which a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied, the device comprising:
a voltage generation circuit that outputs a predetermined voltage; and
a driver circuit that generates a voltage pulse to be applied to the pixel based on the predetermined voltage supplied from the voltage generation circuit, wherein:
the voltage generation circuit comprises:
a step-up part that generates a step-up voltage from a power source voltage;
a voltage switching part that generates a voltage control signal specifying a voltage value of an output voltage from the voltage generation circuit; and
a voltage stabilization part that generates the predetermined voltage in accordance with the voltage control signal from the step-up voltage supplied from the step-up part;
the voltage stabilization part is configured so as to suppress variations in output voltage with respect to variations in the step-up voltage;
the step-up part has two step-up DC-DC converters that use one inductor each, and an output voltage of one of the two step-up DC-DC converters is higher than the pulse wave height of a high voltage pulse at the time of the first step and the other output voltage is higher than the pulse wave height of a lower voltage pulse at the time of the second step, and an output terminal of the two step-up DC-DC converters is connected to one output terminal via a diode; and
the step-up part switches the step-up voltages between the first step and the second step by controlling the turning on/off of the two step-up DC-DC converters.

9. The cholesteric liquid crystal display device according to claim 8, wherein the diode is a Schottky barrier diode having a small forward voltage.

10. The cholesteric liquid crystal display device according to claim 8, wherein:
the voltage stabilization part comprises an amplifier circuit configured to suppress variations in output voltage with respect to variations in the step-up voltage;
a voltage amplification factor G of the amplifier circuit is greater than one; and
an input voltage of the amplifier circuit is 1/G of a voltage that driver circuit applies to a pixel and is not affected by an output voltage of the two step-up DC-DC converters.

11. The cholesteric liquid crystal display device according to claim 10, wherein
the amplifier circuit has an inverting amplifier circuit or non-inverting amplifier circuit of an operational amplifier and a circuit that compensates for the reduction in power source voltage variation suppression ratio in a high frequency region.

12. The cholesteric liquid crystal display device according to claim 11, wherein
the circuit that compensates for the reduction in power source voltage variation suppression ratio in a high frequency region is a serially connected circuit of a capacitive element and a resistor connected to an output terminal of the operational amplifier.

13. The cholesteric liquid crystal display device according to claim 8, wherein
a step-up ratio of at least one of the two step-up DC-DC converters is controlled by changing a voltage to be applied to a feedback terminal of the step-up DC-DC converter via a resistor.

14. A method of driving a cholesteric liquid crystal display device, the device comprising:
a voltage generation circuit that outputs a predetermined voltage; and
a driver circuit that generates a voltage pulse to be applied to a pixel based on the predetermined voltage supplied from the voltage generation circuit, wherein:
the voltage generation circuit comprises:
a step-up part that generates a step-up voltage from a power source voltage;
a voltage switching part that generates a voltage control signal specifying a voltage value of an output voltage from the voltage generation circuit; and
a voltage stabilization part that generates the predetermined voltage in accordance with the voltage control signal from the step-up voltage supplied from the step-up part, wherein
the voltage stabilization part is configured so as to suppress variations in output voltage with respect to variations in the step-up voltage, in the method:
a first step for applying a high voltage pulse to initialize a pixel to be rewritten into a planar state and a second step for applying a low voltage pulse to increase a coexistence ratio of a focal conic state to the planar state in the initialized pixel are performed and a gradation value is determined by a cumulative time during which the low voltage pulse is applied; and
the step-up ratios of the step-up part are switched between the first step and the second step.

15. The method of driving a cholesteric liquid crystal display device according to claim 14, wherein:
the voltage stabilization part comprises an amplifier circuit configured to suppress variations in output voltage with respect to variations in the step-up voltage;
a voltage amplification factor G of the amplifier circuit is greater than one; and
an input voltage of the amplifier circuit is 1/G of a voltage that driver circuit applies to a pixel and is not affected by an output voltage of the step-up DC-DC converter.

16. The method of driving a cholesteric liquid crystal display device according to claim 15, wherein the amplifier circuit has an inverting amplifier circuit or non-inverting amplifier circuit of an operational amplifier and a circuit that compensates for the reduction in power source voltage variation suppression ratio in a high frequency region.

17. The method of driving a cholesteric liquid crystal display device according to claim 16, wherein
the circuit that compensates for the reduction in power source voltage variation suppression ratio in a high frequency region is a serially connected circuit of a capacitive element and a resistor connected to an output terminal of the operational amplifier.

* * * * *